United States Patent
Petersen

(10) Patent No.: US 6,617,747 B1
(45) Date of Patent: Sep. 9, 2003

(54) PM MOTOR AND GENERATOR WITH A VERTICAL STATOR CORE ASSEMBLY FORMED OF PRESSURE SHAPED PROCESSED FERROMAGNETIC PARTICLES

(75) Inventor: Christian C. Petersen, Sandwich, MA (US)

(73) Assignee: Petersen Technology Corporation, Bourne, MA (US)

( * ) Notice: Subject to any disclaimer, the term of this patent is extended or adjusted under 35 U.S.C. 154(b) by 0 days.

(21) Appl. No.: 10/188,441

(22) Filed: Jul. 2, 2002

(51) Int. Cl.[7] .................................................. H02K 1/12
(52) U.S. Cl. ........................ 310/254; 310/258; 310/259; 310/44; 310/67 R; 310/261
(58) Field of Search ............................. 310/254, 67 R, 310/44, 261, 258, 259, 216

(56) References Cited

U.S. PATENT DOCUMENTS

| | | | | |
|---|---|---|---|---|
| 4,004,167 A | * | 1/1977 | Meckling | 310/154.25 |
| 5,105,115 A | * | 4/1992 | Shinryo et al. | 310/258 |
| 5,536,985 A | * | 7/1996 | Ward et al. | 310/44 |
| 6,157,102 A | * | 12/2000 | Suzuki et al. | 310/44 |
| 6,232,681 B1 | * | 5/2001 | Johnston et al. | 310/44 |
| 2002/0117907 A1 | * | 8/2002 | Gay et al. | 310/44 |

* cited by examiner

Primary Examiner—Thanh Lam
(74) Attorney, Agent, or Firm—Mueller and Smith, LPA

(57) ABSTRACT

A d.c. PM motor and corresponding generator having a stator core assembly which is formed of a pressure-shaped processed ferromagnetic particulate material. The spaced apart isotropic core components of the stator core assembly are generally disposed in parallel relationship with the motor axis or generator axis, having a flux interaction region with a flux interaction surface located adjacent the confronting magnetic surface of a rotor and being generally coextensive with the principal dimension thereof to form an air gap. Each core component includes a winding region extending generally in parallel relationship with the device axis a field winding length to a ring-shaped back iron region. The back iron region interconnects the core components in magnetic field exchange relationship. Field windings are mounted over the core components in connection with supporting bobbins.

48 Claims, 13 Drawing Sheets

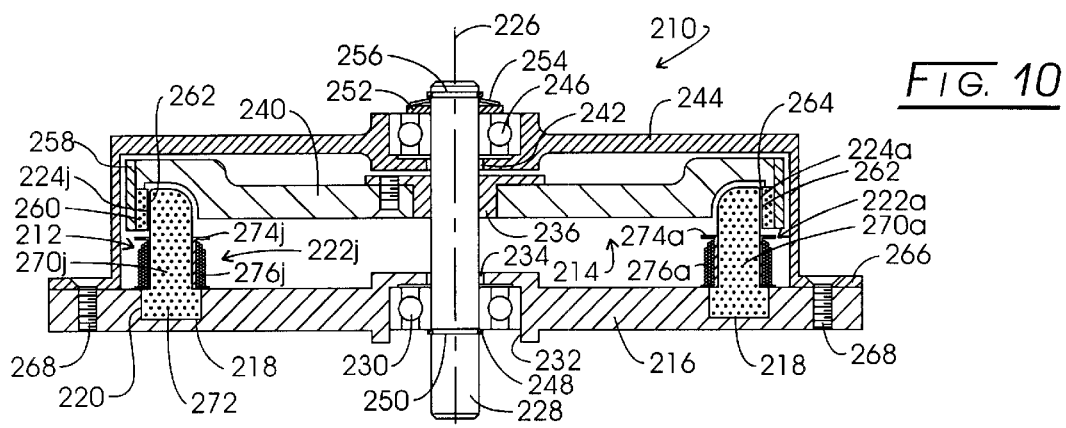
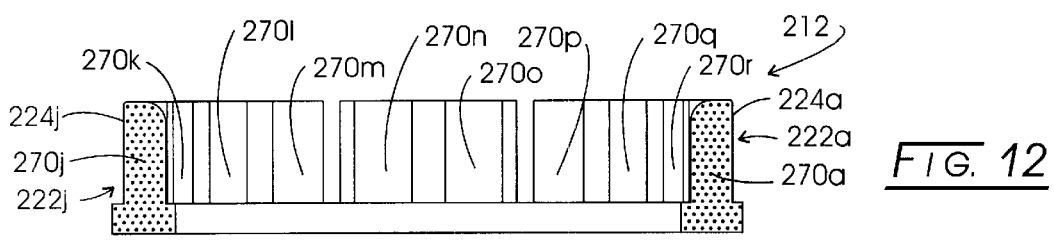

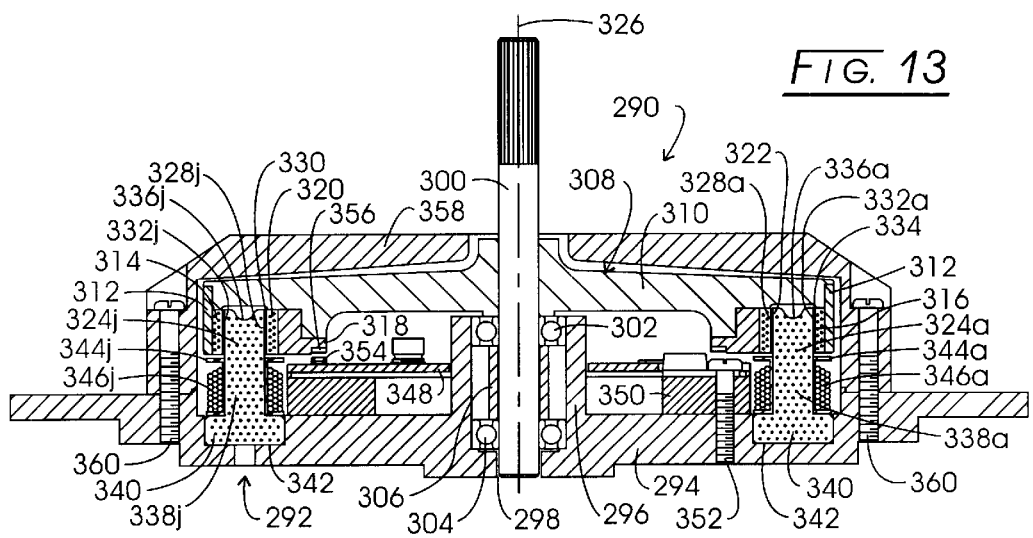
FIG. 13
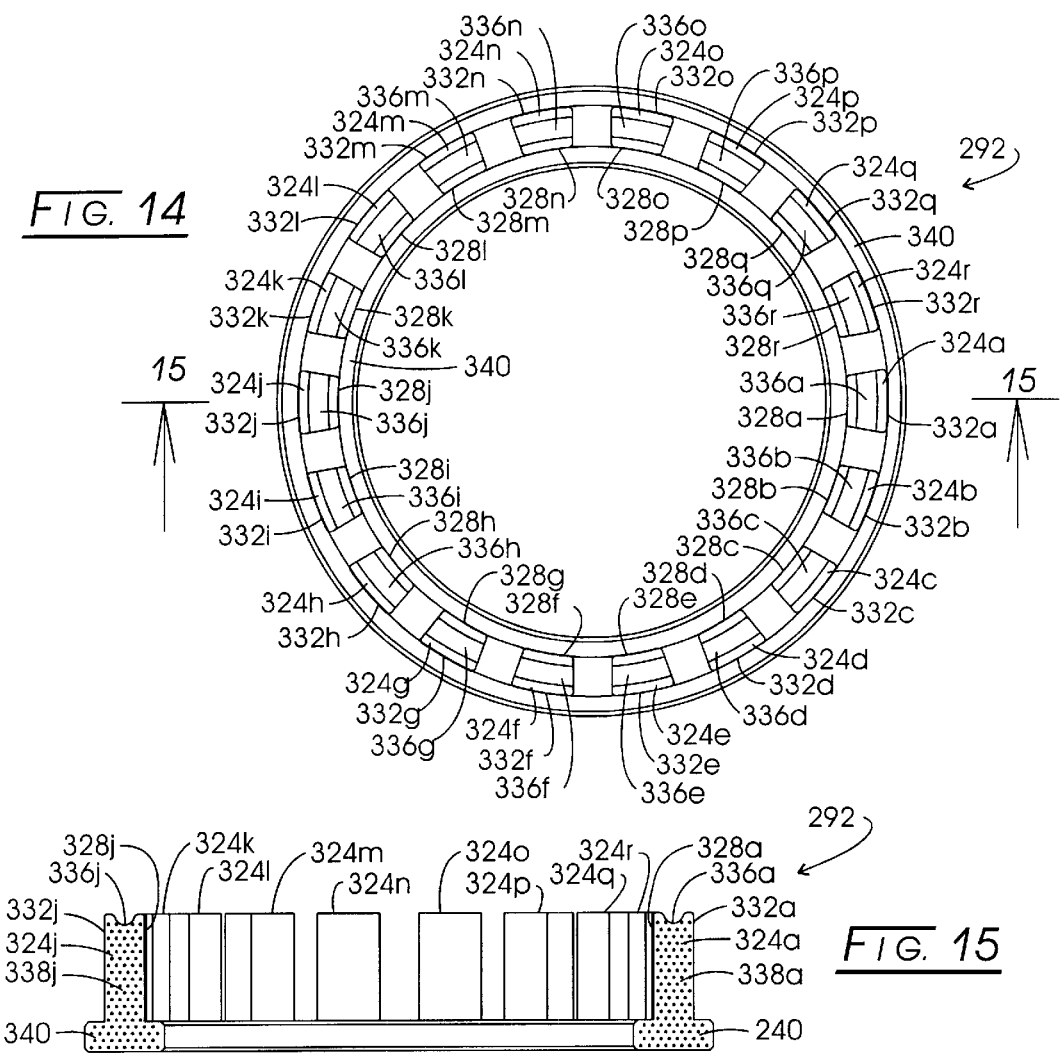
FIG. 14
FIG. 15

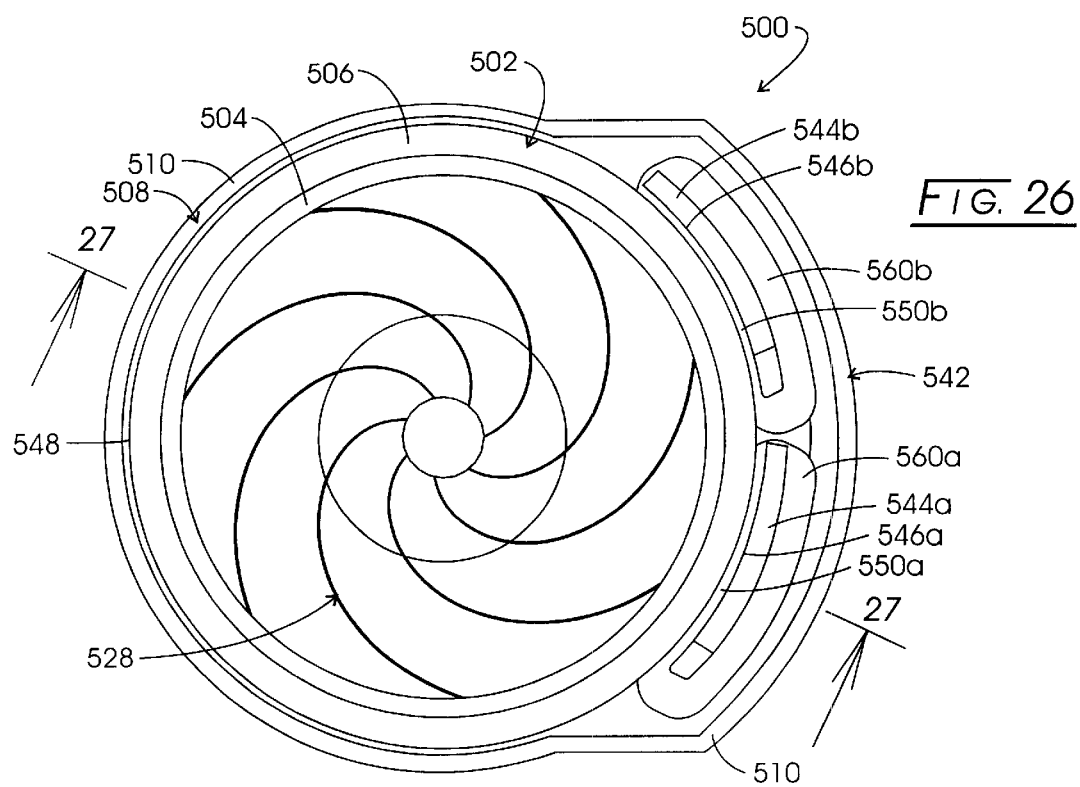
FIG. 26
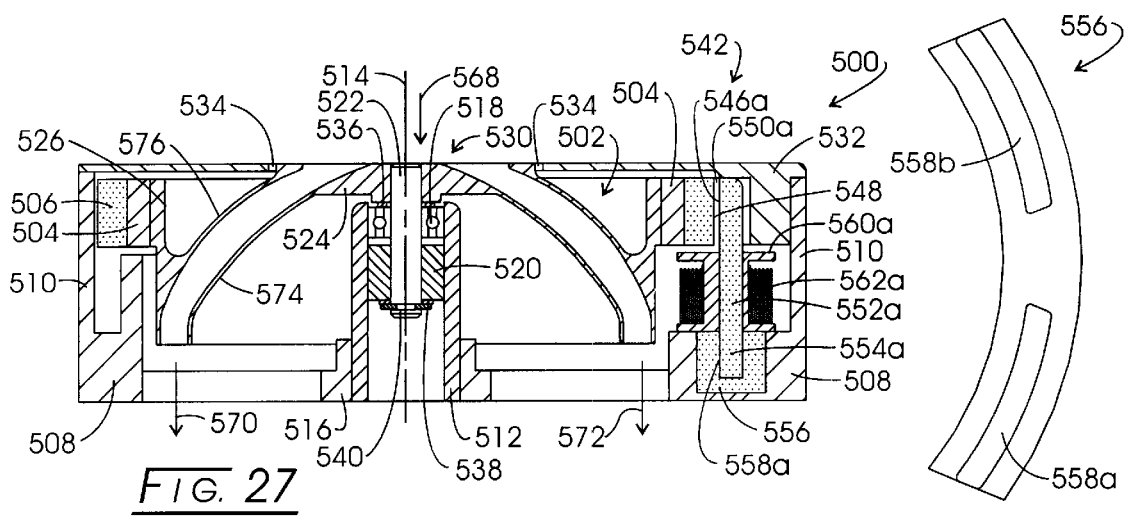
FIG. 27
FIG. 28
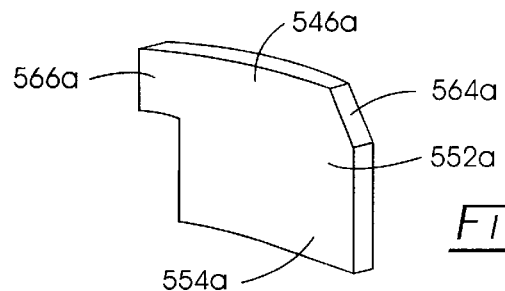
FIG. 29

PM MOTOR AND GENERATOR WITH A VERTICAL STATOR CORE ASSEMBLY FORMED OF PRESSURE SHAPED PROCESSED FERROMAGNETIC PARTICLES

BACKGROUND OF THE INVENTION

Investigators in the electric motor arts have been called upon to significantly expand motor technology from its somewhat static status of many decades. Improved motor performance particularly has been called for in such technical venues as computer design and secondary motorized systems carried by vehicles, for example, in the automotive and aircraft fields. With progress in these fields, classically designed electric motors, for example, utilizing brush-based commutation, have been found to be unacceptable or, at best, marginal performers.

From the time of its early formation, the computer industry has employed brushless d.c. motors for its magnetic memory systems. The electric motors initially utilized for these drives were relatively expensive and incorporated a variety of refinements particularly necessitated with the introduction of rotating disc memory. For example, detent or reluctance torque phenomena has been the subject of correction. The phenomena occurs as a consequence of the nature of motors configured with steel core stator poles and associated field windings performing in conjunction with permanent magnets. With such component combinations, without correction, during an excitation state of the motor windings which create motor drive, this detent torque will be additively and subtractively superimposed upon the operational characteristics of the motor output to distort the energized torque curve, increase ripple torque, reduce the minimum torque available for starting and, possibly develop instantaneous speed variations. Such instantaneous speed variations generally have not been correctable by electronics. Particularly over the recent past, the computer industry has called for very low profile motors capable of performing in conjunction with very small disc systems and at substantially elevated speeds.

Petersen, in U.S. Pat. No. 4,745,345, entitled "D.C. Motor with Axially Disposed Working Flux Gap", issued May 17, 1988, describes a PM d.c. motor of a brushless variety employing a rotor-stator pole architecture wherein the working flux gap is disposed "axially" wherein the transfer of flux is parallel with the axis of rotation of the motor. This "axial" architecture further employs the use of field windings which are simply structured, being supported from stator pole core members, which, in turn, are mounted upon a magnetically permeable base. The windings positioned over the stator pole core members advantageously may be developed upon simple bobbins insertable over the upstanding pole core members. Such axial type motors have exhibited excellent dynamic performance and efficiency and, ideally, may be designed to assume very small and desirably variable configurations.

Petersen in U.S. Pat. No. 4,949,000, entitled "D.C. Motor", issued Aug. 14, 1990 describes a d.c. motor for computer applications with an axial magnetic architecture wherein the axial forces which are induced by the permanent magnet based rotor are substantially eliminated through the employment of axially polarized rotor magnets in a shear form of flux transfer relationship with the steel core components of the stator poles. The dynamic tangentially directed vector force output (torque) of the resultant motor is highly regular or smooth lending such motor designs to numerous high level technological applications such as computer disc drives which require both design flexibility, volumetric efficiency, low audible noise, and a very smooth torque output.

Petersen et al, in U.S. Pat. No. 4,837,474 entitled "D.C. Motor", issued Jun. 6, 1989, describes a brushless PM d.c. motor in which the permanent magnets thereof are provided as arcuate segments which rotate about a circular locus of core component defining pole assemblies. The paired permanent magnets are magnetized in a radial polar sense and interact without back iron in radial fashion with three core components of each pole assembly which include a centrally disposed core component extending within a channel between the magnet pairs and to adjacently inwardly and outwardly disposed core components also interacting with the permanent magnet radially disposed surface. With the arrangement, localized rotor balancing is achieved and, additionally, discrete or localized magnetic circuits are developed with respect to the association of each permanent magnet pair with the pole assembly.

Petersen in U.S. Pat. No. 5,659,217, issued Feb. 10, 1995 and entitled "Permanent Magnet D.C. Motor Having Radially-Disposed Working Flux-Gap" describes a PM d.c. brushless motor, which is producible at practical cost levels commensurate with the incorporation of the motors into products intended for the consumer marketplace. These motors exhibit a highly desirable heat dissipation characteristic and provide improved torque output in consequence of a relatively high ratio of the radius from the motor axis to its working gap with respect to the corresponding radius to the motors' outer periphery. The torque performance is achieved with the design even though lower cost or, lower energy product permanent magnets may be employed with the motors. See also: Petersen, U.S. Pat. No. 5,874,796, issued Feb. 23, 1999.

Over the years of development of what may be referred to as the Petersen motor technology, greatly improved motor design flexibility has been realized. Designers of a broad variety of motor driven products including household implements and appliances, tools, pumps, fans and the like as well as more complex systems such as disc drives now are afforded a greatly expanded configuration flexibility utilizing the new brushless motor systems. No longer are such designers limited to the essentially "off-the-shelf" motor variety as listed in the catalogues of motor manufacturers. Now, motor designs may become components of and compliment the product itself in an expanded system design approach.

During the recent past, considerable interest has been manifested by motor designers in the utilization of magnetically "soft" processed ferromagnetic particles in conjunction with pressed powder technology as a substitute for the conventional laminar steel core components of motors. With this technology, the fine ferromagnetic particles, which are pressed together, are essentially mutually electrically insulated. So structured, when utilized as a motor core component, the product will exhibit very low eddy current loss which will represent a highly desirable feature, particularly as higher motor speeds and resultant core switching speeds are called for. As a further advantage, for example, in the control of cost, the pressed powder assemblies may be net shaped wherein many intermediate manufacturing steps and quality considerations are avoided. Also, tooling costs associated with this pressed powder fabrication are substantially lower as compared with the corresponding tooling required with typical laminated steel fabrication. The desirable molding approach provides a resultant magnetic particle structure that is 3-dimensional magnetically and avoids the difficulties encountered in the somewhat two-dimensional magnetic structure world of laminations. See generally U.S. Pat. No. 5,874,796 (supra).

The high promise of such pressed power components, however, currently is compromised by the unfortunate characteristic of the material in exhibiting relatively low permeability as contrasted at least with conventional laminar core systems. Thus the low permeability has called for 1½ to 2 times as many ampere turn deriving windings. In order to simultaneously achieve acceptable field winding resistance values, the thickness of the winding wire must be increased such that the wire gauge calls for bulksome structures which, in turn, limit design flexibility. Indeed, earlier designers confronting the permeability values available with processed ferromagnetic particle technology will, as a first inclination, return to laminar structures. This is particularly true where control over the size of the motors is mandated as, for example, in connection with the formation of brushless d.c. motors employed with very miniaturized packaging. However, the disc drive industry now seeks such compact packaging in conjunction with high rotational speeds. In the latter regard, speed increases from around 7200 rpm to 15000 rpm and greater now are contemplated for disc drives which, in turn, must perform with motors the profile of which is measured in terms of a small number of millimeters. In general, lamination-based core structures cannot perform as satisfactorily at the higher core switching speeds involved, while particulate core-based structures have been hindered by the size restraints.

Petersen, in application for U.S. patent Ser. No. 09/728,236 filed Dec. 1, 2000 entitled "d.c. PM Motor With a Stator Core Assembly Formed of Pressure Shaped Processed Ferromagnetic Particles" and assigned in common herewith addresses the use of processed ferromagnetic particles to provide a d.c. PM motor of a "radial" variety wherein flux transfer at the working gap as well as core component structuring is generally aligned with radii extending from the motor axis, Efficiency is achieved, inter alia, by enhancing the coupling of the applied field into the stator core structure through the utilization of transitions in levels between the radially disposed induction region and field winding support region of each core component.

BRIEF SUMMARY OF THE INVENTION

The present invention is addressed to a d.c. PM motor as well as a corresponding generator which combines a radially directed magnetic flux transference at a working or functional gap with a pole or stator core structure wherein the stator cores are in a parallel relationship with the axis of the motor. When combined with the three dimensional structuring capabilities of pressure shaped processed, mutually insulated magnetically "soft" ferromagnetic particle stator core assembly structuring, important improvements in motor performance are realized in conjunction with a capability for reduction in weight, size and cost. In the latter regard, no more of the processed stator core assembly material is utilized beyond a given design tolerance factor for magnetic flux saturation.

A salient feature of the PM motor and generator structures hereunder resides in a broadened design flexibility accorded for essentially any given application of the technology. Motors application specific to a variety of implements, tools and appliances have been seen to replace, for example, the a.c. corded devices of the past. This replacement is with structures which are more powerful, capable of performing on battery power and yet are smaller and lighter. With respect to output torque achieved with the technology, motors configured according to the instant architecture will exhibit a ratio of radius-to-working gap ($R_{RG}$) to the radius extending to the outer periphery or surface of the motor ($R_M$) which is greater than about 0.6.

In one embodiment of the invention, the three dimensional capabilities for structuring the stator core assemblies are combined with a rotor structure having two radially outwardly disposed ring-shaped permanent magnets, each having a confronting magnetic surface adjacent oppositely disposed stator core component flux interaction surfaces to essentially double the rotor performance. By radially aligning the common polarities of the sequentially magnetized dual permanent magnets, a localized magnetic balance effect is achieved wherein the unbalance force vector evolved at one working gap is substantially cancelled by the unbalance force vector at the adjacent working gap. This feature permits a motor design wherein the internal region of the motor can be accessed from its side for a variety of purposes. For instance, the drive output of a rotor shaft may be tapped at the center of the motor to provide a side acting drive output. Such outputs can, for example, develop a linear actuator function. The attributes of the geometry and stator core materials as disclosed with respect to motor operation can equally be applied to generator operation.

BRIEF DESCRIPTION OF THE DRAWINGS

FIG. 10 is a sectional view of another version of a motor structured in accordance with the invention;

FIG. 11 is a top view of a stator core structure employed with the motor of FIG. 10;

FIG. 12 is a sectional view taken through the plane 12—12 shown in FIG. 11;

FIG. 13 is a sectional view of another motor structured in accordance with teachings of the invention;

FIG. 14 is a top view of a stator core structure employed with the motor of FIG. 13;

FIG. 15 is a sectional view taken through the plane 15—15 shown in FIG. 14;

FIG. 26 is a top view of a fan and motor assembly configured in accordance with the teachings of the invention with a top portion removed to reveal internal structure;

FIG. 27 is a sectional view taken through the plane 27—27 shown in FIG. 26 which further incorporates portions removed from FIG. 26;

FIG. 28 is a top view of a back iron region component employed with the assemblage of FIG. 26;

FIG. 29 is a perspective view of a stator core component employed with the assemblage of FIG. 26;

DETAILED DESCRIPTION OF THE INVENTION

In the discourse to follow, a salient characteristic of the motors described, resides in the presence of a flux gap wherein magnetic flux interaction is generally in a radial direction, i.e., along a radius from the motor axis and wherein the core components of the stator assembly generally are arranged in a fashion in parallel with the axis of the motor. Thus, electromagnetic flux induced from the field windings travels in general along a path which may be considered parallel with the motor axis, while magnetic flux interaction at the working or functional gap of the motor is, as noted above, considered as a radial transference. A variety of advantages accrue from this arrangement, particularly with the three dimensional attributes available with a stator core assembly formed with pressed powder metal technology. In this regard, requisite cross sections of the core material are readily available to avoid saturation at designed maximum load and the number of turns in the field winding region can be varied to meet the specific needs of an application independently of the extent of the permanent magnet induction area. Accordingly, the motors which evolve from the instant technology are referred to as application specific. In general, for a given application, the motors will provide improved output at lower weight, size and cost. The latter cost aspect is minimized through the above-discussed fabrication techniques available with these materials and by virtue of the designer being given the opportunity to design specifically to the maximum load characteristics anticipated with a given motor application. No more stator core material need be utilized than is necessary to provide, for example, a design safety factor for saturation of about 20% to 25%.

Figure 1:
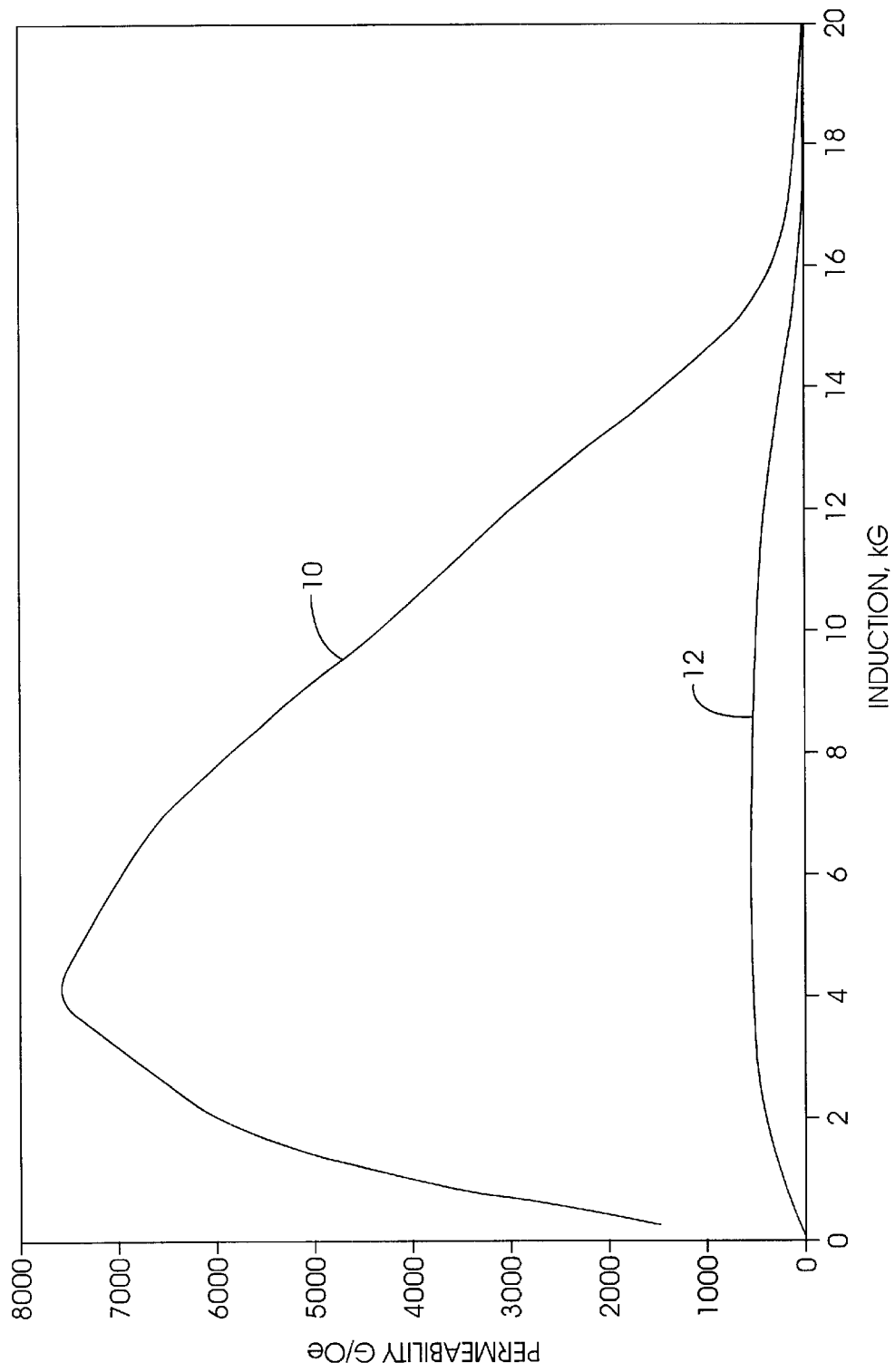
FIG. 1 is a chart demonstrating the variation of permeability between a conventional laminar stator core structure and a stator core structure according to the invention.

FIG. 1 illustrates the immediately apparent design disadvantage occasioned by the low permeability design parameter accompanying utilization of processed ferromagnetic materials for core structuring as compared with a quality lamination material. In the figure, curves are shown which plot permeability with respect to induction in kilogauss (kG). Curve 10 is developed from a conventionally available laminate material identified as M-19FP having a 24 gauge thickness. The reader may now contrast the permeability characteristics of this conventional material with the corresponding permeability characteristics of the processed ferromagnetic materials as are employed with the motors of the invention, as represented at curve 12. The material deriving in curve 12 is identified as SM-2HB marketed by Mii Technologies, LLC of West Lebanon, N.H. This material is described as having low eddy current losses as a percentage of hysteresis loss. For example, at 60 Hz, and an induction of 1.5 Tesla, the material exhibits 9% eddy current loss and 91% hysteresis loss. The material is capable of providing a significant advantage for electrically commutated motors that operate at frequencies higher than line frequencies. However, its permeability characteristics would, at first observation, render it unfit to meet the packaging and performance criteria sought in many applications. In fact, for the motor designs at hand, the low permeability characteristics readily are accommodated for while the motors are ideally suited for application specific utilization.

Figure 2:
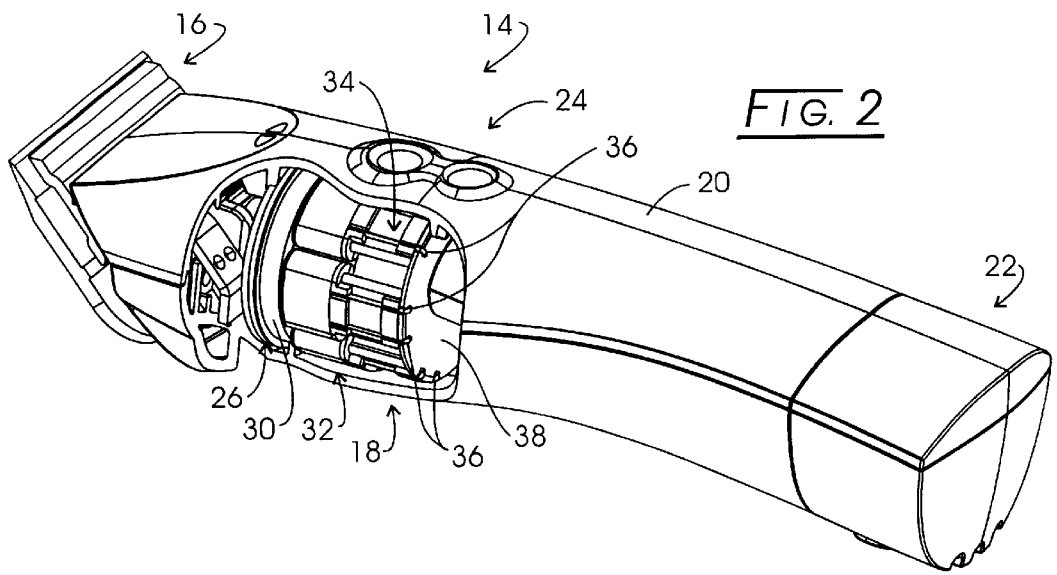
FIG. 2 is a perspective view of an animal hair clipper incorporating a motor structured in accordance with the invention, the figure have portions broken away to reveal internal structure.

Such an application specific employment of the instant technology is represented in FIG. 2. In the figure, a handheld hair clipper is represented generally at 14. The clipper 14, while incorporating conventional reciprocal driven blades or cutters represented generally at 16, employs a d.c. FM motor according to the invention as represented in general at 18 located within a hand-held plastic housing represented in general at 20. Power to the motor 18 is provided from a battery pack formed as an extension of housing 20 as represented in general at 22 and the device 14 may be activated or actuated by a switch button assembly represented in general at 24. Device 14 replaces an a.c. corded brush-type motor clipper with a structure having more power and lighter weight even with the addition of the weight of battery pack 22. Motor 18 is fixed within the interior of housing 20 at a grooved circular aluminum base represented generally at 26 through which the motor shaft 28 (seen in FIG. 3) extends for connection with the noted blade drive eccentric mechanism. Extending about the periphery of the base 26 is an integrally formed powdered metal stator core structure having six poles or core components extending from an integrally formed back iron region in generally parallel relationship with the axis of motor 18. Portions of the back iron region are shown at 30 and field winding assemblies associated with the winding regions of the core components are represented generally at 32. Seen extending upwardly for each core component are portions of bobbin assemblies certain of which are represented in general at 34. Each of these bobbins within the assembly 34 supports beginning and ending leads from the field windings in slots formed therein. Certain of these leads are shown at 36 as they are so supported and extended to slots formed within a printed circuit board 38. At printed circuit board 38 the leads are interconnected to provide for three phase operation of motor 18. These leads also function to retain the printed circuit board 38 in place.

Figure 3:
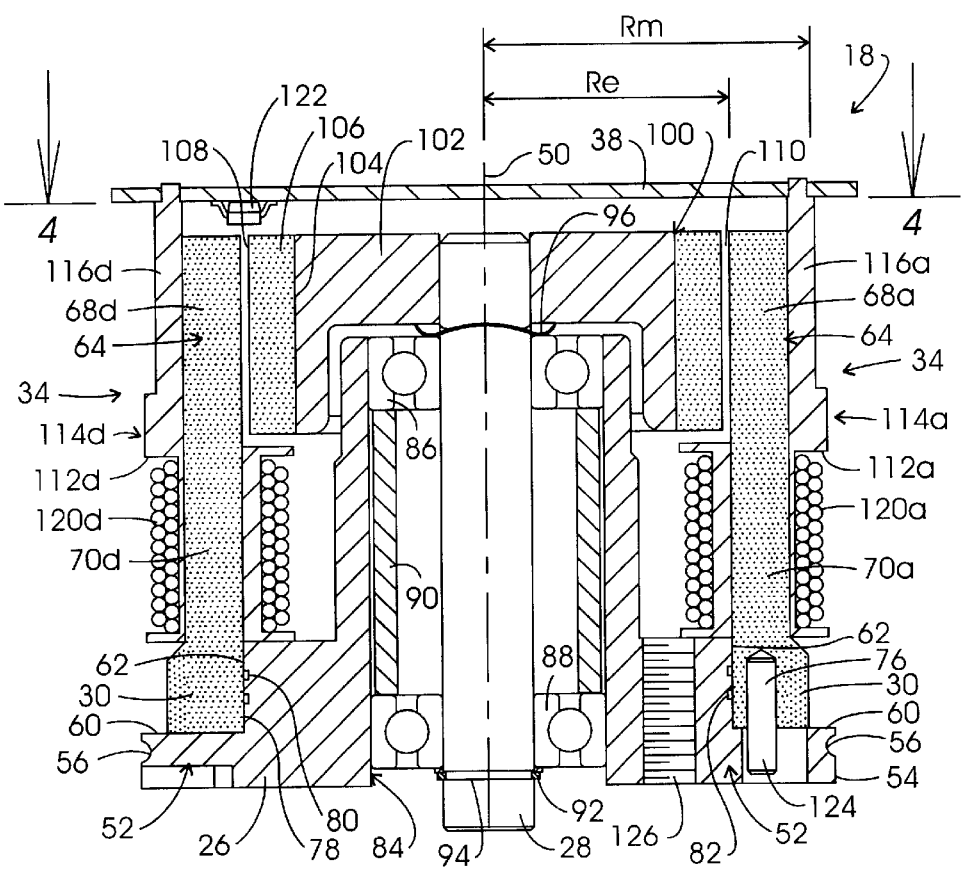
FIG. 3 is a sectional view of the motor shown in FIG. 2.

Referring to FIG. 3, motor 18 reappears in conjunction with aluminum base 26. Base 26 is configured symmetrically about the axis 50 of motor 18, having a forward flange represented in general at 52 the circular edge 54 of which carries a connecting groove 56 which is engageable with support structures internally of the device housing 20. Supported upon the annular rearward surface 60 of flange 52 as well as in conjunction with a recessed cylindrical base shoulder portion 62 is a pressed powder metal stator core assembly 64.

Figure 5:
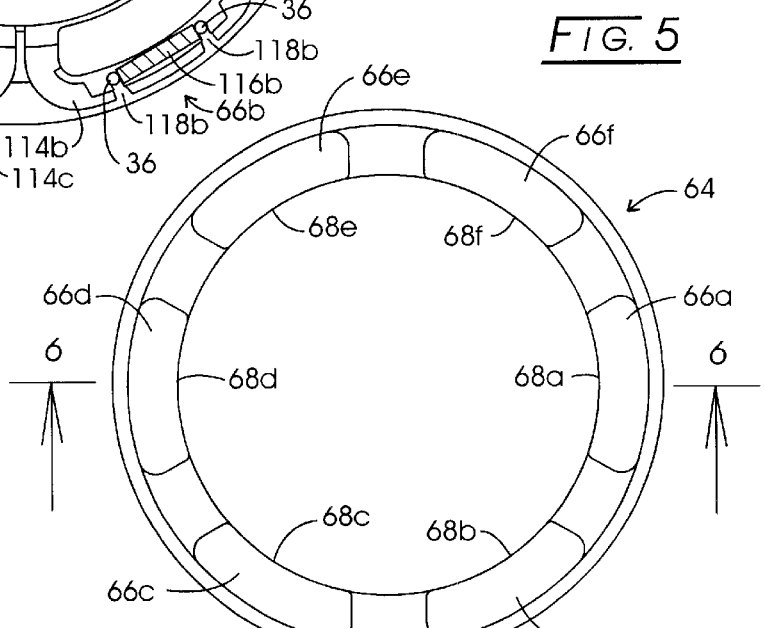
FIG. 5 is a top view of a stator core structure employed with the motor of FIG. 3.
Figure 6:
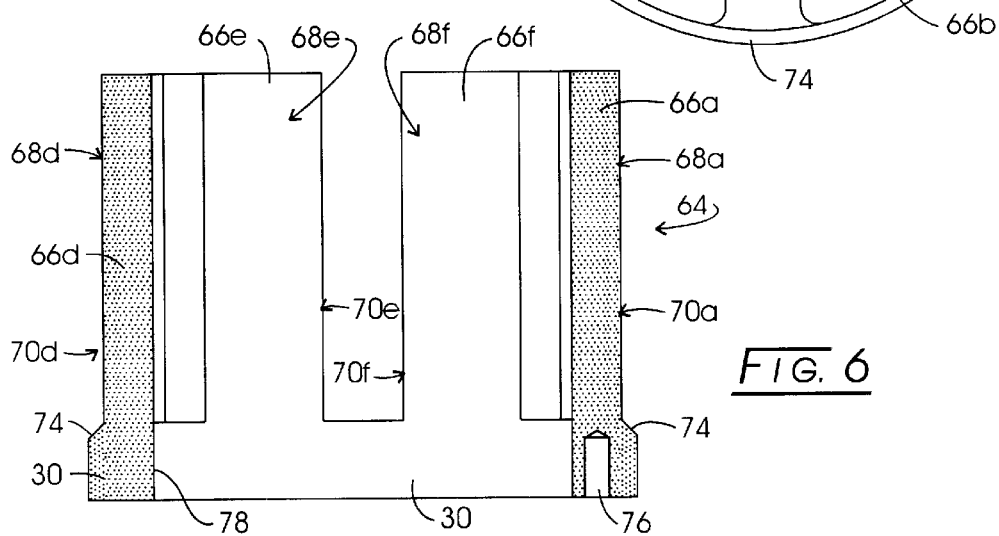
FIG. 6 is a sectional view taken through the plane 6—6 shown in FIG. 5.

Looking momentarily to FIGS. 5 and 6, the integrally formed stator core assembly 64 is seen to incorporate spaced apart isotropic core components 66a–66f. As represented in FIG. 6, each such core component 66a–66f, in turn, includes a flux interaction region 68a–68f which has length along the motor axis which is generally coextensive with the principal dimension of the permanent magnet assembly of an associated rotor. The flux interaction regions 68a–68f are each integrally associated with a winding region as represented in general at 70a–70f, winding regions 70a, 70d and 70e being seen in FIG. 6. These winding regions also are arranged generally in parallel with the motor axis 50 and extend a field winding length from a location in spaced adjacency with the flux interaction region to an integrally formed annulus shaped back iron region 30. Note that the radial dimension of back iron region 30 is enlarged by being stepped outwardly as at 74. This enlarged resultant magnetic flux confronting cross sectional area is designed to avoid saturation with a safety factor of, for instance, about 20% to about 25%. FIG. 6 further reveals an upstanding cylindrically shaped cavity 76 which functions to receive a locating pin.

The internal surface 78 of the back iron region 30 is slide fitted and glued against base shoulder portion 62 as represented in FIG. 3. Returning to that figure, formed within the base shoulder portion 62 are two annular adhesive-retaining grooves 80 and 82 to secure the assembly 64.

Base 26 further is configured to define an open cylindrical bearing housing 84 which is symmetrically disposed about motor axis 50 and functions to rotatably support motor shaft 28 with structurally robust ball bearings 86 and 88. In this regard, the inner races of bearings 86 and 88 support and rotate with the shaft 28 and, bearing 86 is spaced apart from bearing 88 with a spacer cylinder 90 which is glued into position. Shaft 28 is retained in position by a snap ring 92 located within a shaft groove 94 and a spring or wavy washer 96 abutting the outside surface of bearing 86. The outside surfaces of bearing 86 and 88 are glued in position.

Attached to the shaft 28 is a permanent magnet carrying rotor represented generally at 100 and formed having a cylindrical steel back iron 102 with a cylindrical outer surface 104 which carries a four segment or region cylindrical permanent magnet 106. Permanent magnet 106 preferably is formed from a bonded rare earth material and provides a confronting magnetic surface 108 which is spaced from the corresponding flux interaction regions as shown in FIG. 3 at 68a and 68d a working or functional gap distance to define the working gap 110. The confronting magnetic surface 108 is configured with a principal dimension parallel with the motor axis 50 which corresponds or is generally coextensive with the length in parallel with motor axis 50 of the flux interaction regions 68a–68f.

FIG. 3 reveals that the winding regions 70a–70f (regions 70a and 70d being shown in the figure) extend a field winding length from a location at the inward winding flanges 112a–112f of the individual bobbins 114a–114f of the bobbin assembly 34 to the integrally formed back iron region 30. Accordingly, the winding regions extend in generally parallel relationship with the motor axis 50 that field winding length from a location in spaced adjacency with the flux interaction regions 68a–68f. This provides for clearance of the windings and the winding flanges 112a–112f from the lower surface of the rotor 100.

Figure 4:
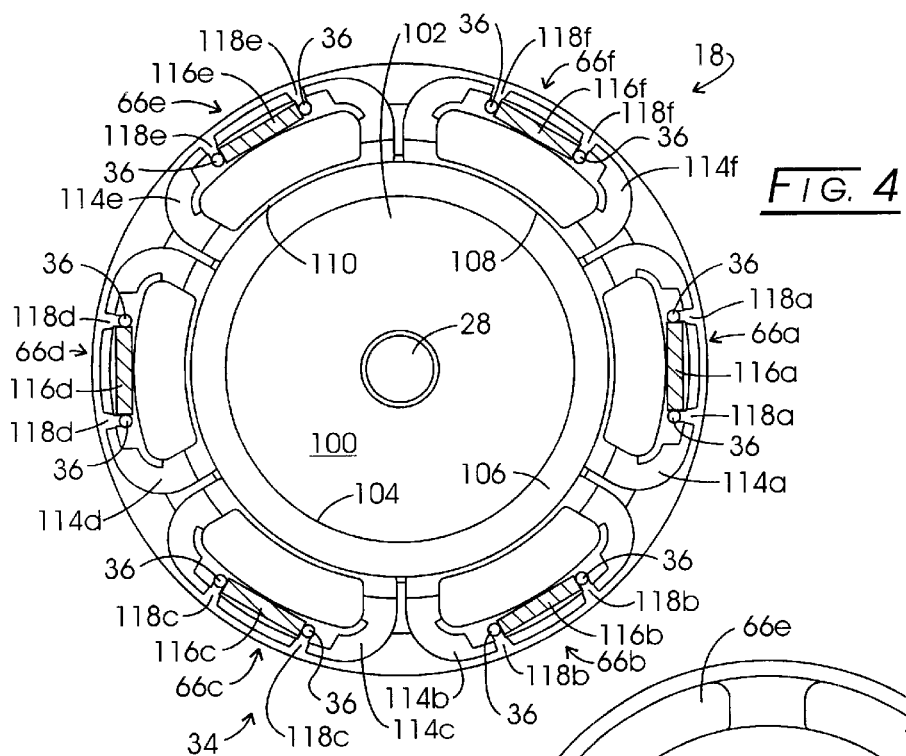
FIG. 4 is a sectional view taken through the plane 4—4 shown in FIG. 3.

Looking additionally to FIG. 4, the individual bobbins as represented at 114a–114f are revealed. As indicated in connection with the description accompanying FIG. 2, bobbins 114a–114f are each configured additionally with an integrally formed elongate lead support portion 116a–116f. Those lead support portions incorporate slots as shown at 118a–118f which in turn support the beginning and ending leads of the windings, two of which are seen in FIG. 3 at 120a and 120d. Leads 36 are joined at the circular printed circuit board 38 to define the excitation circuit. As part of the excitation control, for a typical three phase implementation, three Hall effect devices are employed, one of which is seen in FIG. 3 at 122 located over the working gap 118 at the underside of circuit board 38. The figure also reveals a positioning pin 124 within the cavity 76 and a threaded attachment bore 126.

A characteristic of the instant motor designs resides in the rather substantial amount of space available internally within the motors. For the embodiment of the instant figures, that space is taken by quite robust ball bearings which are used in view of the side loads imposed upon shaft 28 by the eccentric drives of the clipper apparatus 14. Substantial torque is achieved with the motor 18 by virtue, inter alia, of the ratio of the radius, $R_M$(3⅜ mm) from motor axis 50 to the outside surface of the motor with respect to the radius to the gap, $R_G$(2½ mm). The latter radius is measured from the motor axis 50 to the internally disposed surface of the core component flux interaction regions 68a–68f. For the instant application, that ratio amounts to about 0.71, a quite high value for the size of the motor employed. In general, this ratio will equal or exceed about 0.6 for the "vertical" core component and radial flux interaction structuring. Note that the motor 18 provides no moving components at its outside surface other than the protruding shaft 28. As a consequence, the outside of the motor is available for mechanical purposes, including the mounting of it within housing 20.

Figure 7:
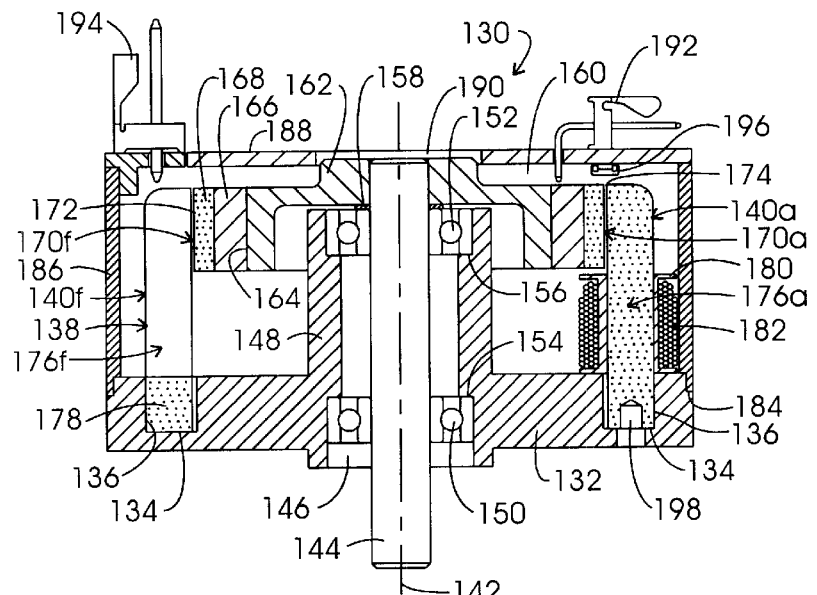
FIG. 7 is a sectional view of another version of a motor structured according to the invention.
Figure 8:
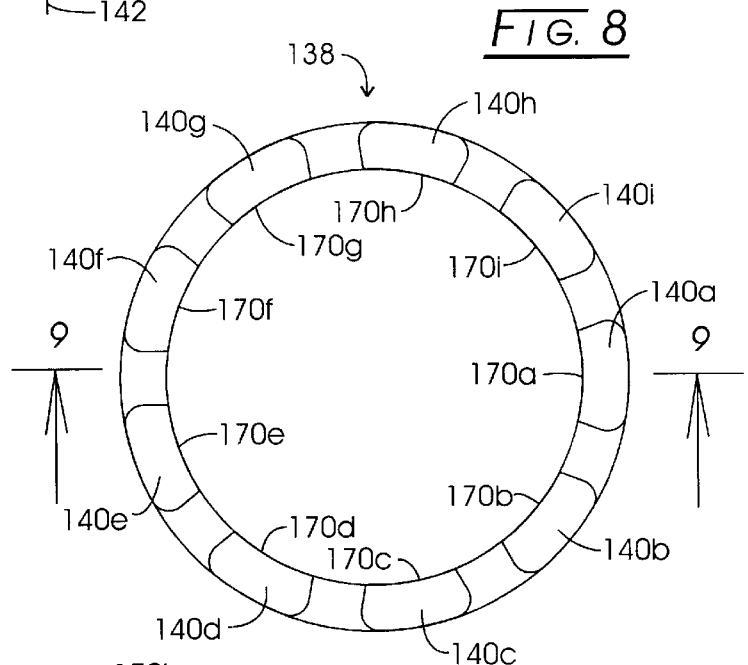
FIG. 8 is a top view of a stator core structure employed with the motor of FIG. 7.
Figure 9:
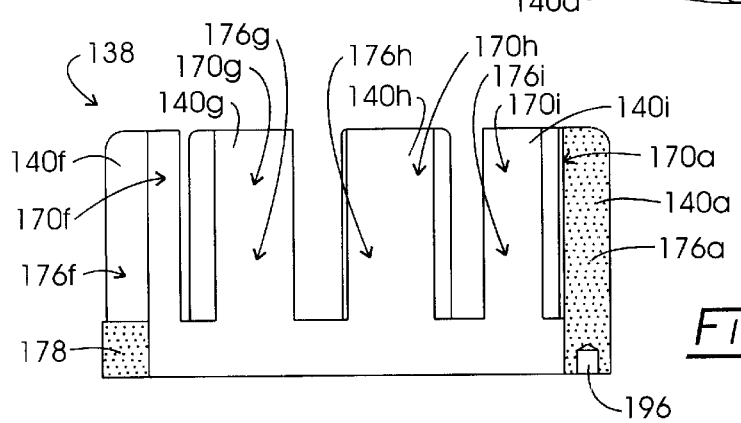
FIG. 9 is a sectional view taken through the plane 9—9 shown in FIG. 8.

Referring to FIGS. 7–9, a larger motor structure applying the instant architecture is revealed in general at 130. Motor 130 is configured with a generally cylindrically shaped motor base 132 formed of aluminum. Within the base 132 there is machined an annular groove represented generally at 134 exhibiting a rectangular cross section. Of this cross section, the outer annular surface 136 functions as a control for the press fitting insertion thereinto of a stator core assembly represented generally at 138. Assembly 138 is formed of pressure shaped processed ferromagnetic particles which form, in conjunction with a ring-shaped base, nine isotropic upstanding core components shown in FIG. 8 at 149a–140i. As before, each of the core components 140a–140i of the stator core assembly 138 is generally arranged in parallel relationship with the motor axis. Returning to FIG. 7, that axis is revealed at 142 extending through the center of the motor shaft 144. Shaft 144, in turn, is mounted within a bearing housing represented generally at 146. Housing 146 is formed within the aluminum base 132 as a cylindrical portion 148 having shoulder defining countersunk regions for supporting two ball bearing structures 150 and 152. In this regard, bearing 150 is located against an annular shoulder 154, while bearing 152 nests against a similar annular shoulder 156. Shaft 144 extends through a washer 158 for engagement with a rotor represented generally at 160. Rotor 160 incorporates a nonmagnetic rotor support portion 162 which may be formed with a high strength plastic. Portion 162 is generally cylindrically shaped and fixed to shaft 144 and its outer cylindrical surface 164 is fastened to a ring-shaped back iron component 166, the outward surface of which, in turn, supports a bonded rare earth magnet ring 168. Looking additionally to FIGS. 8 and 9, as before, each of the core components of the stator core assembly, while arranged in generally parallel relationship to motor axis 142, is formed with a flux interaction surface represented generally at 170a–170i. As seen at flux interaction surfaces 170a and 170f in FIG. 7, those surfaces are located in spaced adjacently with and coextensive with the adjacent rotor confronting magnetic surfaces shown at 172 to define a working or functioning gap represented at 174. Integrally formed with and extending from the flux interaction surfaces 170a–170i are the winding regions 176a–176i which extend, in turn, a field winding length from spaced adjacency with the flux interaction surfaces as described at 170a–170i to a ring-shaped back iron region 178. As described earlier, the entire stator core assembly 138 is integrally formed using the noted pressure shaped processed ferromagnetic particles. Note that the external surface of the back iron region 178 is located in controlled surface adjacency with the groove surface 136 of groove 134 for fabrication control purposes. FIG. 7 shows one of the nine polymeric bobbins as at 180 which is configured in conjunction with field windings as at 182. This structuring is repeated for each of the core components 140a–140i. Base 132 further is configured with an outer shoulder portion 184 which receives a corresponding flange of a cylindrical aluminum or polymeric motor side component 186. Component 186, in turn, extends to connection with a polymeric top and circuit support 188 having a circular opening 190 formed centrally therewithin and supporting connector assemblages as at 192 and 194 as well as three Hall effect sensing devices for a conventional three phase control, one of such Hall devices being represented at 196 on the underside of the circuit support 188 over working gap 174.

In general, the rotor magnet ring 166 will be provided with six regions or magnetic segments of alternating polarity. The motor 130 generally performs at a rotational speed of about 6000 rpm and may function, for example, as a an automotive fuel pump. For this application, a pump impeller may be integrated with the rotor structure with alterations to the bearing structure. Such an arrangement is made available by the relatively large amount of open volume at the center region of these motors. Finally, FIGS. 7 and 9 reveal a positioning pin cavity 196 formed within the back iron region 176. The motor 130 will exhibit the above-noted working gap to outside surface radii ratio, $R_G/R_M$ of greater than about 0.6.

Referring to FIGS. 10–12, a motor represented generally at 210 is illustrated. Motor 210 is of relatively flat architectural demeanor having a stator core assembly 212 with eighteen isotropic core components performing in conjunction with a rotor represented generally at 214 which is configured having sequence of twelve or sixteen magnetic regions or segments of alternating polarity. Motor 210 functions to drive an automotive blower fan and its rotational speed is in a range of about one thousand to five thousand rpm. The motor is formed incorporating an aluminum base 216 having an annular groove 218 machined therein exhibiting a rectangular cross section with an outwardly disposed control surface 220. Stator core assembly 212 as revealed in connection with FIGS. 11–12 is formed having upstanding core components 222a–222r. Unlike the earlier embodiments, the flux interaction surfaces 224a–224r face radially outwardly from the motor axis 226 (FIG. 10). Flux interaction surfaces 224a–224r, as before, are located adjacent the confronting magnetic surface of the rotor 214. In this regard, FIG. 10 shows the rotor 214 to be mounted for rotation about axis 226 upon a motor shaft 228. Shaft 228, in turn, is supported from a base-mounted ball bearing located within a cylindrical cavity 232 formed in base 216. Cavity 232 is formed with a shaft access opening 234 through which shaft 228 passes into engagement with rotor 214 at a flange plate assembly 236. Plate assembly 236 is attached by machine screws, one of which is revealed at 238 to a rotor body 240. Shaft 228 extends through an opening 242 in cylindrical motor housing 244 to be engaged with housing mounted ball bearing 246. The shaft is secured within this bearing mounting arrangement by a snap ring 248 positioned within a groove 250 within shaft 228 adjacent bearing 230 and with a washer 252 and snap-on spring washer arrangement 254 engaged within a groove 256 formed within shaft 228 adjacent bearing 246.

Rotor body 240 extends to a ring-shaped back iron 258 the radially inwardly lower surface of which supports a ring-shaped bonded rare earth magnet 260. Note that rotor body 240 is fabricated out of a non-magnetic and preferably non-conductive material because of its close proximity to the top of the stator core components 222a–222r which are transient flux carrying elements. It is not desirable to induce a field or current into the rotor body. Magnet 260 has an inwardly radially directed confronting magnetic surface 262 which is coextensive with and adjacent to the flux interaction surfaces 224a–224r to define a working or functional gap 264 providing for a generally radially evoked interaction of magnetic flux. Housing 244 is of generally cylindrical configuration, having an outwardly disposed annular flange portion 266 which attached to the inward surface of base 216 by a plurality of machine screws, two of which are shown at 268.

As revealed in FIGS. 10 and 12, isotropic core components 222a–222r extend from the noted flux interaction surfaces 224a–224r to integrally formed winding regions 270a–270r. Regions 270a–270r have a general parallel relationship with the motor axis 226 and extend a field winding length from a location in spaced adjacency with the flux interaction surfaces 224a–224r to a ring-shaped back iron region 272. Note that region 272 has an expanded radial dimension of cross sectional area selected in correspondence with the noted saturation design criteria. Extending over each of the core components 222a–222r are polymeric bobbins, two of which are seen in FIG. 10 at 274a and 274j, each of these bobbins being associated with each core component field winding region and carrying field windings, two of which are shown at 276a and 276j.

No rotor 214 rotational detectors such as Hall devices are shown in the FIG. 10. For this larger motor a circuit arrangement to detect rotor position is utilized incorporating a back EMF type motor controller manufactured by Fairchild Semiconductor Corp. of South Portland Me. 04107. As is apparent from FIG. 10, the gap radius/motor radius ratio, $R_G/R_M$, for this radially outwardly gapped structuring is quite high contributing to improved torque performance.

Referring to FIGS. 13–15 a motor having an architecture evoking higher power levels as well as enhanced application is shown in general at 290. Motor 290 is configured having a stator core assembly represented generally at 292 which incorporates eighteen core components or poles and performs in conjunction with a rotor magnet exhibiting twelve zones or segments of alternating magnetic polarity. However, those twelve zones are provided in each of two radially spaced apart bonded rare earth ring magnets working with two radially spaced apart working or functional gaps developed in conjunction with oppositely disposed flux interaction surfaces.

Looking to FIG. 13, the motor 290 is seen to be formed with a base 294 formed of aluminum so as to accommodate for heat buildup. The base 294 is configured to integrally incorporate a cylindrically shaped bearing housing 296 having a downwardly disposed cylindrical opening 298 into which the lower portion of a motor shaft 300 extends for free rotation. Shaft 300 is supported within the bearing housing 296 by upper and lower ball bearings shown respectively at 302 and 304 which are spaced apart by an aluminum cylindrical bearing spacer 306. Above the bearing 302, shaft 300 is attached to a rotor shown generally at 308. Rotor 308 is formed having a rotor body 310 formed of a rigid plastic material such as a glass reinforced modified polyethylene terephthalate (PET) sold under the trade designation Rynite 545NCCC010 by DuPont de Nemours Co, Inc. Note that rotor body 310 is formed of a non-magnetic and non-conductive material for the same reasons as was rotor body 240 of motor 210 shown in FIG. 10. The rotor body 310 extends initially to a peripherally disposed ring-shaped outer back iron 312 which radially inwardly is connected to a bonded rare earth ring-shaped permanent magnet 314 having a confronting magnetic surface 316 facing radially inwardly. Spaced radially inwardly from the back iron ring 312 is a second back iron component having a generally ring-shaped and L-shaped cross sectional configuration as represented at 318. Attached radially outwardly of the back iron 318 is an inwardly disposed ring-shaped permanent magnet 320. Magnet 320 has a radially outwardly facing confronting magnetic surface 322. Each of the permanent magnets 314 and 320 are formed with twelve magnetic segments or regions which alternate in polarity and, for the instant embodiment, those polarities for each magnet 314 and 320 are in polar alignment for the purpose of maximum torque generation and locally eliminating unbalance force vectors that would otherwise exist at each energized pole-magnet air gap.

Magnet rings 314 and 320 perform in concert with stator core assembly 292 which, as before, is formed of pressure-shaped processed ferromagnetic particles and is integrally formed generally in the shape of an inverted "T". The eighteen spaced apart isotropic core components of the core assembly 292 are seen in FIGS. 14 and 15 at 324a–324r. Each of these core components 324a–324r are configured with oppositely disposed flux interaction surfaces which are generally coextensive with the principal dimensions taken in parallel with motor axis 326 of the permanent magnet confronting surfaces 316 and 322. FIG. 14 shows the radially inwardly disposed flux interaction surfaces at 328a–328r which establish the radially inwardly disposed working or functional gap 330 as seen in FIG. 13. The radially outwardly disposed flux interaction surfaces of core components 324a–324r are shown respectively at 332a–332r. These outwardly disposed flux interaction surfaces 332a–332r perform in concert with confronting magnetic surface 316 to establish a radially outwardly disposed working or functional gap seen in FIG. 13 at 334. The cross-sections of the core components 324a–324r as particularly seen in FIGS. 13 and 15 reveal that their uppermost tips are configured to more efficiently assign flux interaction to the oppositely disposed flux interaction surfaces 328a–328r and 332a–332r. This is carried out by forming a somewhat shallow valley within the top of each core component. These valleys, as seen at 336a–336r, in effect, force magnetic flux to the oppositely disposed flux interaction surfaces. Valleys 336a–336r are readily formed utilizing the pressing manufacturing approach for the stator core assembly 292.

As in the earlier embodiments, the core components 324a–324r integrally incorporate winding regions as shown at 338a and 338j in FIGS. 13 and 15. These winding regions reside in spaced adjacency with the flux interaction surfaces 328a–328r and 332a–332r and extend a field winding length to an integrally formed ring-shaped back iron region 340. Back iron region 340 is press fitted into an annular groove 342 formed within the base 294 as seen in FIG. 13. FIG. 13 also reveals two of the eighteen bobbins employed to carry the field windings for each core component. In this regard, a bobbin 344a is shown carrying a field winding 346a and a bobbin 344j is seen supporting field winding 346j.

FIG. 13 also illustrates that the somewhat large internal volume of the motor 290 is utilized for mounting a control electronic circuit board 348 which is mounted upon a ring-shaped aluminum stand off 350 fixed by machine screws as at 352 to the base 294. Aluminum stand-off 350 serves to form a heat sink in combination with aluminum base 294. Circuit board 348 carries the requisite number of Hall effect devices utilized for, for example, three phase control. One such Hall effect device is shown at 354 performing in conjunction with a slave magnetic ring 356 supported from back iron 318. Slave magnet 356 is magnetized with regions corresponding with the magnetization of ring magnets 314 and 320. Motor 290 further is configured having a housing formed of the earlier described rigid plastic material and shown at 358. Housing 358 is secured to the base 294 by machine screws, certain of which are revealed at 360.

An important feature associated with the utilization of two radially spaced rotor magnets as at 314 and 320 resides in a localized negation of motor unbalancing force vectors which occur in almost all motor working gaps. It may be recalled that the magnetic segments or regions are radially aligned facing north-to-north and south-to-south. As the magnets move from a condition of being equal field centered (half N-S) over each individual energized stator pole the unbalance force vectors at that pole commence to be created. However, those vectors are substantially equal and directly oppositely disposed at each oppositely disposed pole gap, in effect, mutually canceling. This localized elimination of unbalance force vectors serves to amplify the scope of applications to which motor 290 may be employed. For example, the motor shaft can be accessed from the side by the elimination of core components. A typical three phase control will repeat, for example, in a phase A-phase B-phase C-phase sequence and those core components involved in that sequencing generally are juxtaposed to each other. Thus, for example, three core components can be removed and the motor will still operate satisfactorily. However it will perform with fifteen instead of eighteen core components or poles and thus will exhibit fifteen eighteenths of its otherwise available torque. The side entry opening may, for example, access the motor shaft to provide a crank and eccentric output extending from the side of the motor or, for example, a pulley may be internally disposed with the shaft to carry a belt output extending from the side of the motor.

Figure 16:
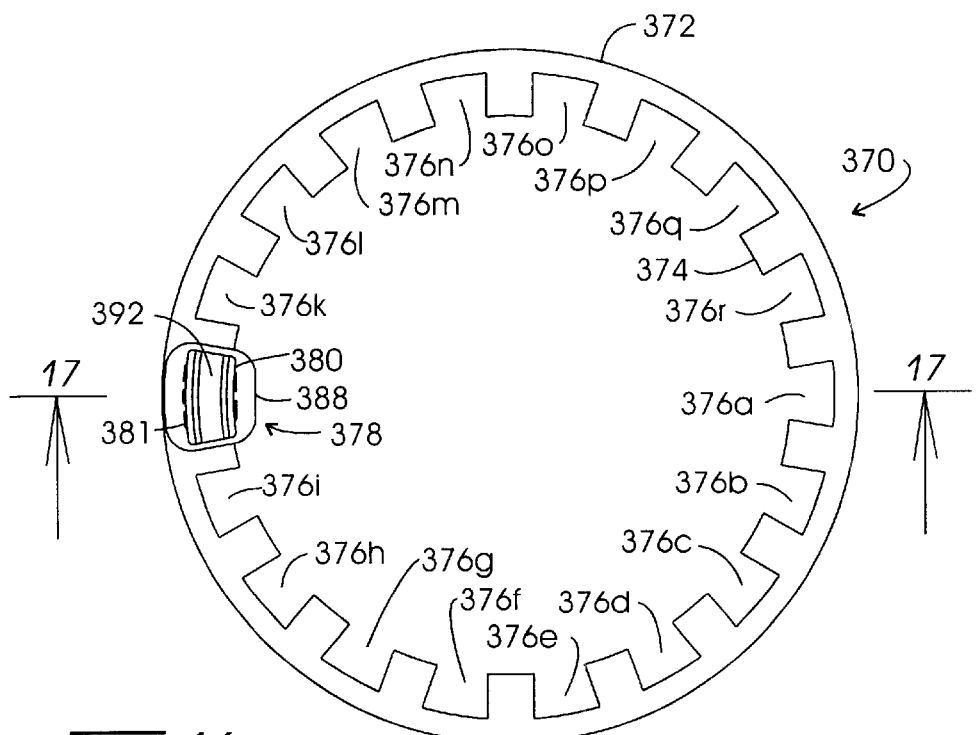
FIG. 16 is a top view of an alternate back iron region which may be employed with the motor of FIG. 13, the view showing a core component with a bobbin as inserted within the back iron region component.
Figure 18:
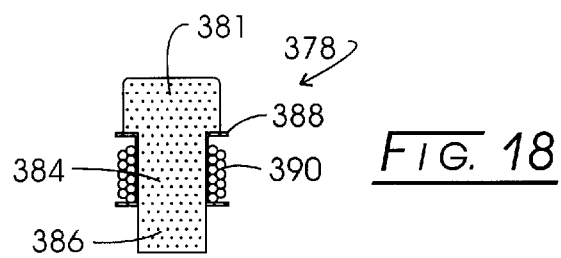
FIG. 18 is a sectional view taken through the plane 18—18 shown in FIG. 17.
Figure 17:
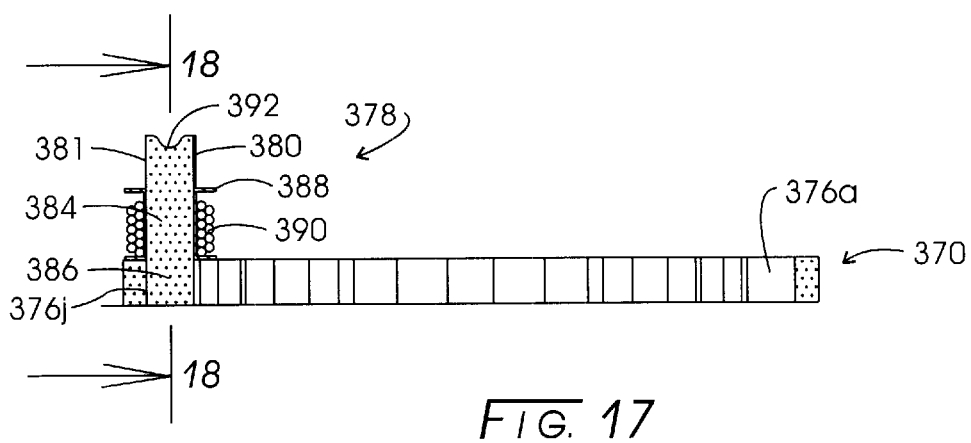
FIG. 17 is a sectional view taken through the plane 17—17 shown in FIG. 16.

For some applications, it is desirable to circumferentially flair the flux interaction surfaces of the core components. Referring to FIGS. 16–18, the structuring of the stator core assembly having core components with such flared flux interaction surfaces is revealed. An advantageous aspect of the pressure shaped processed ferromagnetic particle construction resides in the attribute that this material can be pressed as separate components which then are abutted together and adhesively interconnected. These interconnections preferably are held in a compressive state as opposed to a tensional state. In order to provide flared flux interaction surfaces, it is necessary that the bobbins and associated field windings be inserted from the back iron region of the stator core assembly. FIG. 16 reveals a discrete ring-shaped back iron component 370 having a circular outer circumference 372 and an inner circumference as at 374 which is interrupted by a sequence of eighteen key slots 376a–376r located at the core component or pole positions. One core component having a flared tip is shown in FIG. 17 in general at 378. The structure of this core component 378 is duplicated for each of the core component positions and, as seen in FIGS. 17 and 18, the oppositely disposed flux interaction surfaces are identified at 380 and 381. FIG. 18 reveals that these surfaces 380 and 381 are flared or extended circumferentially. Immediately below these flux interaction surfaces 380 and 381 there is integrally formed the field winding region 384 which in turn extends to a component of the back iron region at 386. Before the back iron region component 386 is inserted within a slot as at 376j, a bobbin and field winding assembly, as represented respectively at 388 and 390, is inserted over the back iron region component 386 and into position against the field winding region 384. The sub assembly then is inserted and adhesively attached to slot 376j as seen in FIG. 17. As in the case of motor 290, the tip of each core component is formed with a flux directing valley as seen at 392 in FIGS. 16 and 17.

Upon initial assembly of the stator core component as at 370 with associated bobbins and field windings, that assembly then is located within a slot or annular groove as earlier described at 342 in connection with FIG. 13. To provide for compressive engagement of the back iron region components 386 with the remainder of the back iron component as at 370, the radial thickness of the back iron region component 386 as well as the remaining components of the core component are arranged so that the radially inwardly exposed surface of back iron components as at 386 protrude slightly inwardly from the inner circumference surfaces 374. Following installation in a groove as at 342 as described in connection with FIG. 13, a compression ring preferably formed of steel is inserted to press against these exposed core component surfaces to urge the individual core components into a compressive engagement with the component 370.

Figure 23:
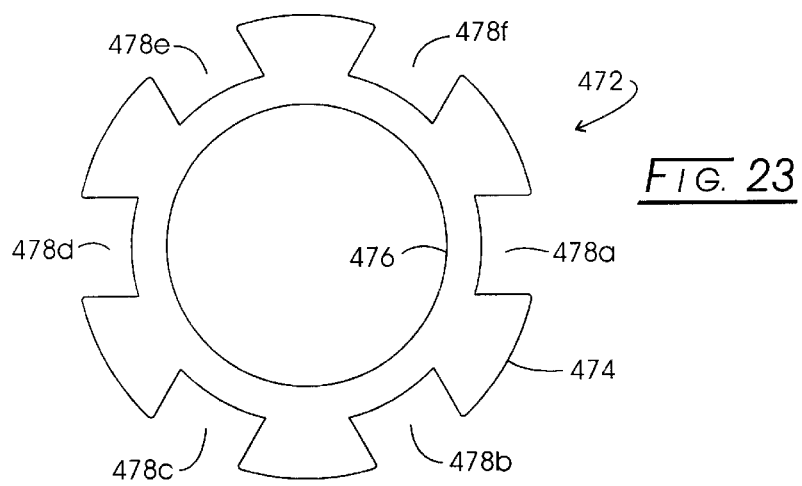
FIG. 23 is a top view of a back iron region component utilized with the motor of FIG. 22.

In an alternate assembly embodiment, one skilled in the art can readily see that the back iron component 370 can be formed with outwardly facing key slots where the assembly compressive ring is applied to the outer exposed surfaces of the slightly protruding back iron regions of the stator core components as shown in FIG. 23.

Figure 19:
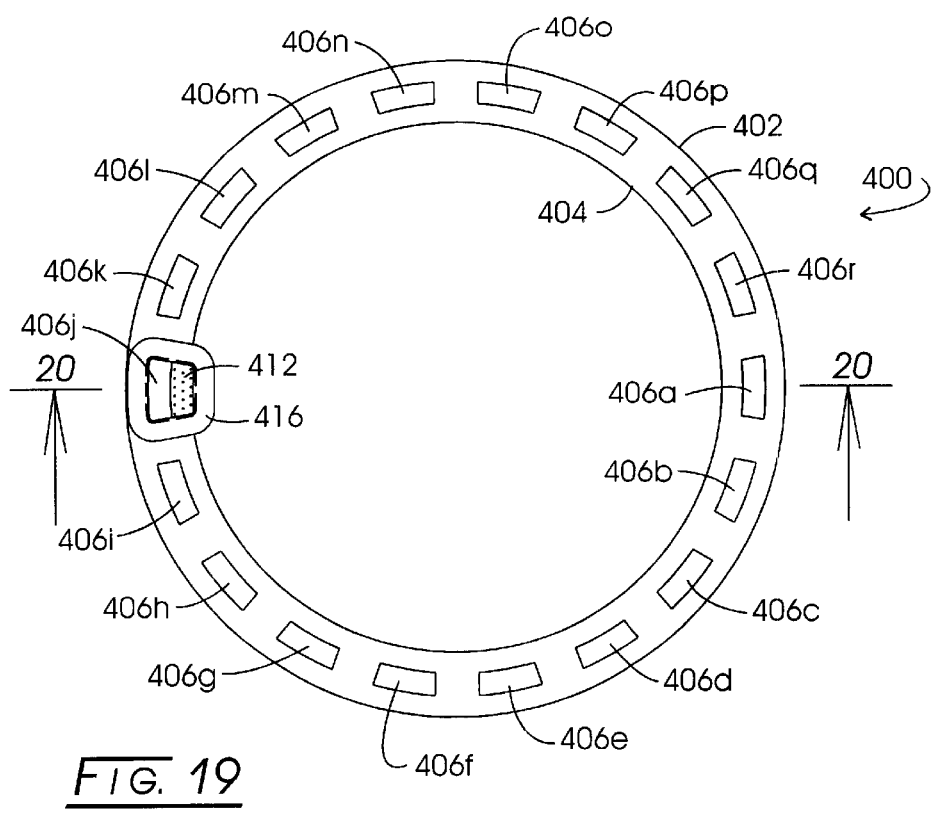
FIG. 19 is a top view of a back iron component of a stator core structure which may be utilized with the motor of FIG. 13, the figure additionally showing a section view of a core component and bobbin assembly.
Figure 21:
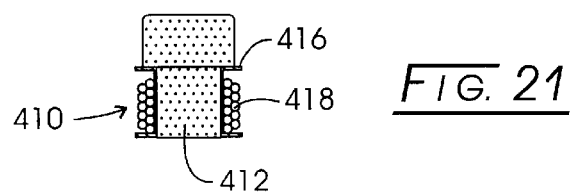
FIG. 21 is a sectional view taken through the plane 21—21 shown in FIG. 20.
Figure 20:
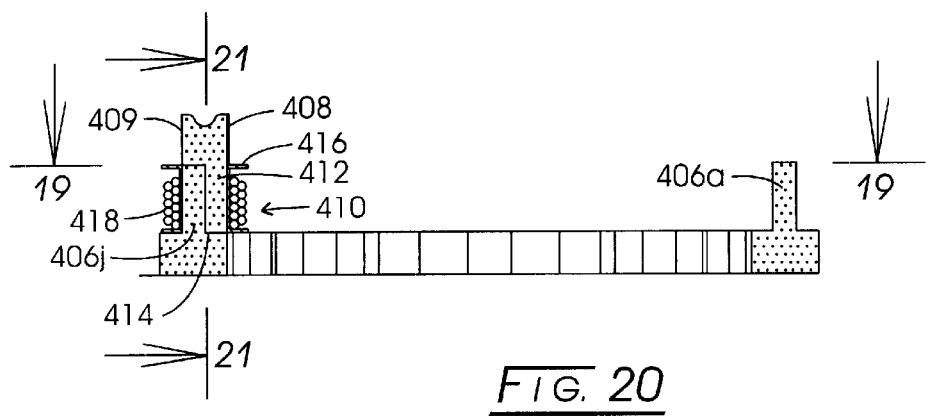
FIG. 20 is a sectional view taken through the plane 20—20 shown in FIG. 19.

Referring to FIGS. 19–21, another approach to providing a stator core assembly wherein the core components have circumferentially flared flux interaction surfaces is revealed. In the figure, a ring-shaped back iron formed of the pressure shaped pressed ferromagnetic particle is represented in general at 400. Back iron 400 includes outer and inner circumferential edges shown respectively at 402 and 404. The back iron 400 is pressed such that an upstanding standard or post extending, for example, a field winding length is provided. These standards or posts are shown in FIGS. 19 and 20 at 406a–406r. Standards 406a–406r form one half of the field winding region of each isotropic stator core component as revealed in FIG. 20. In this regard, as seen additionally in FIG. 21, each core component is discretely pressed with oppositely disposed flux interaction surfaces as shown at 408 and 409 which are spaced apart a common width. A combined resulting field winding region is shown in FIG. 20 at 410. That field winding region represented at 410 is formed, for example, of standard 406j and an extension 412 each representing half the width of the region 410. The pressed components are joined together at a joint representing a lap joint as indicated by the joint outline represented generally at 414. While these two components may be adhesively attached together, they are retained together by a polymeric bobbin as at 416 carrying field windings as at 418.

Figure 22:
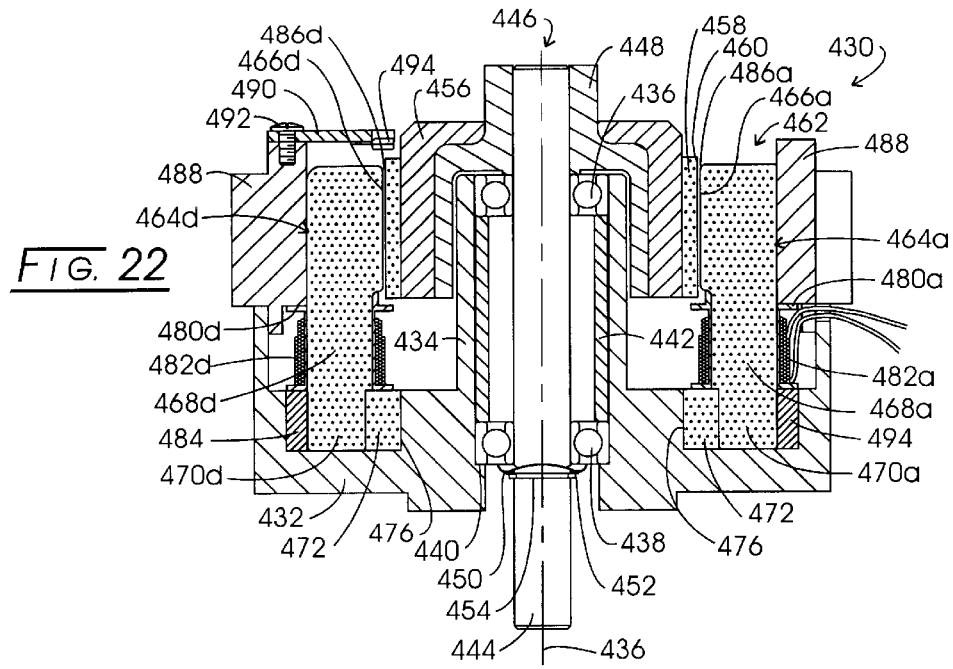
FIG. 22 is a sectional view of another motor structure configured in accordance with the teachings of the invention.

One of the characteristics of the motors at hand is a tendency of the permanent magnet to be biased axially downwardly along the core components. This may be referred to as a tendency of the permanent magnet to satisfy itself resulting in a downward axial magnetic force vector. This axial vector is substantially eliminated with the stator core assembly illustrated in connection with FIGS. 22 through 25. Looking to FIG. 22, a motor is represented generally at 430 having an aluminum base 432 incorporating a bearing housing portion 434 of cylindrical shape disposed symmetrically about the motor axis 436. Bearing housing 434 supports spaced apart upper ball bearing 436 and lower ball bearing 438. The latter bearing is seen to be positioned against an annular ledge 440 formed within the bearing housing portion 434, while the upper bearing 436 is supported by an aluminum cylindrical bearing spacer 442. Bearings 436 and 438 support motor shaft 444 which is fixed to a rotor shown generally at 446. In this regard, connection between the shaft 444 and the rotor 446 is made at a cup-shaped rotor body component 448. Body component 448 may be formed of the earlier-described glass reinforced modified polyethylene terephthalate (PET). The shaft 444 with rotor 446 is inserted through bearings 436 and 438 and secured adjacent ball bearing 438 with a spring or wavy washer 450 in combination with a retaining ring 452 located within a shaft groove 454. Rotor body component 448 supports a steel, cup-shaped back iron 456 which, in turn, supports a ring-shaped bonded rare earth permanent magnet 458. The confronting magnetic surface of magnet 458 at 460 is seen to have a principal dimension in parallel with motor axis 436 which permits it to slightly overlap the flux interaction surfaces of the stator core assembly represented generally at 462. FIG. 22 reveals two of the six core components as shown in general at 464a and 464d. Formed of the isotropic pressure shaped processed ferromagnetic particles, the core components of stator core assembly 462 incorporate a flux interaction surface which extends radially inwardly from the field winding region. Note in this regard, the flux interaction surface 466a of core component 464a and the corresponding flux interaction surface 466d of core component 464d. The core component regions immediately associated with these flux interaction surfaces are seen to be thicker than the field winding regions shown at 468a in conjunction with core component 464a and at 468d in conjunction with core component 464d. Because of the extended thickness of the core component region adjacent the flux interaction surfaces, the bobbin and field winding assemblies are inserted from the back iron region which is formed as two compressibly and adhesively joined parts. In this regard, the back iron region of core component 464a includes integrally formed back iron region 470a which is compressibly joined with a back iron base member 472. Similarly, the integrally formed back iron region of core component 464d is shown at 470d in association with back iron base member 472.

Figure 25:
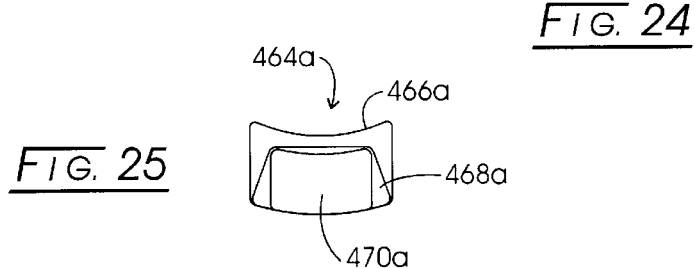
FIG. 25 is a bottom view of the stator core component shown in FIG. 24.
Figure 24:
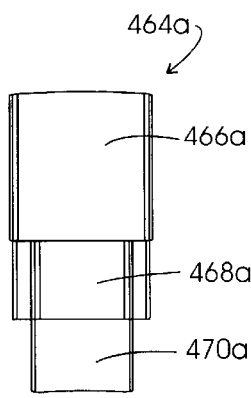
FIG. 24 is a front view of a stator core component employed with the motor of FIG. 22 and the back iron component shown in FIG. 23.

Referring to FIG. 23, the back iron base member 472 is shown to have a general ring-shape extending between outer circumferential edge 474 and inner circumferential edge 476. Outer circumferential edge 474 is discontinuous, being formed with "T" slots 478a–478f. Looking additionally to FIG. 24, the core component 464a is illustrated in a manner looking radially outwardly from the motor axis 436. In the figure, the inwardly offset flux interaction surface 466a appears which is integrally formed with field winding region 468a and the key component of the back iron region 470a. A bottom view of component 464a is seen in FIG. 25. The back iron key component 470a is, for example, inserted in the slot 478a of back iron base member 472 and this arrangement reoccurs for each of the six poles or core components. However, before that insertion occurs, a polymeric bobbin associated with each core component, usually having been wound with a field winding is inserted over the field winding region from the back iron key region, for example, as at 470a. Returning to FIG. 22, a bobbin 480a is seen supporting field winding 482a at the field winding region 468a. Correspondingly, the bobbin 480d carrying field winding 482d is shown positioned over winding region 468d of core component 464d. The assemblage of the core components as at 464a and 464d and the base back iron component 472 is retained in compression by a steel compression ring seen in FIG. 22 at 484. With the arrangement, working or functional gaps as seen at FIG. 22 at 486a and 486d are established. The upper assembly also is structurally supported by an upper support or ring member 488. That member 488 further carries a C-shaped circuit support 490 which is attached thereto by machine screws one of which is shown at 492. In general, the support 490 functions to position three Hall effect devices over the gap as at 486d, one such Hall device being shown at 494.

With the structuring shown, the noted axial bias of the permanent magnet 458 occasioned by its otherwise proximity to the stator winds essentially is eliminated to permit, for example, quieter operation. An aspect of the particular structure shown is an essential absence of manually discernable detent torque. The motor as described in FIGS. 22 to 25 can be reconfigured such that the radially extending flux interaction surfaces of the core components extend radially outwardly from the winding region and the motor incorporates a rotor configured as in FIG. 10 with an inwardly facing confronting magnetic surface. This configuration would yield similar results but with an improvement in the $R_g/R_m$ ratio.

The architecture of the instant motors as characterized by the radially directed flux transfer at the working gap combined with a "vertical" pole or core component assemblage permits the structuring of the motors such that they may comprise only a small portion of a given rotational application. This is demonstrated by the motorized fan illustrated in connection with FIGS. 26 through 29. Looking to FIGS. 26 and 27, the fan as represented generally at 500, is seen to incorporate a motor rotor represented generally at 502 which is configured with a steel ring-shaped back iron 504 which is coupled, in turn, with a bonded rare earth ring-shaped permanent magnet 506. Rotor 502 is rotationally mounted upon a plastic base 508 having integrally formed upstanding sidewall 510. Supported by plastic web components (not shown) is a cylindrical aluminum bearing housing 512 which is disposed symmetrically about motor axis 514. The cylindrical housing 512 is supported from a plastic collar 516 which is supported, in turn, by the noted web components (not shown) which extend from the base 508. Cylindrical housing 512 supports an upwardly disposed ball bearing 518 and a lower disposed sintered bronze bushing 520. Bearings 518 and 520, in turn, support steel motor shaft 522 which is fixed to rotor 502 at a lower blade support 524. Support 524 is formed of plastic and includes fan blade elements 528 which extend from surface 574 and mate with surface 576 of upper blade support 526 which additionally supports the back iron ring 504 and permanent magnet 506 forming the entire rotor 502. The fan blades shown generally at 528 in FIG. 26 exist between surface 574 and 576 and perform in conjunction with an air intake opening represented generally at 530 which is surrounded by a plastic top member 532 as seen in FIG. 27. The opening in top member 532 is seen at 534 in the latter figure.

Shaft 522 is mounted with a washer 536 located above ball bearing 518 and is retained by an E-ring 538 configured about a groove 540. The stator core assembly and associated bobbins and field windings of the two pole motive function are represented in general at 542 and includes stator core components 544a and 544b which are formed of the noted pressure formed or shaped processed ferromagnetic particles to provide an upper region establishing flux interaction surfaces shown respectively at 546a and 546b. Surfaces 546a and 546b are located in spaced adjacency with the confronting magnetic surface 548 of permanent magnet 506 to develop working or functional gaps as at 550a with respect to flux interaction surface 546a and 550b with respect to flux interaction surface 546b. Extending below the flux interactive surfaces are integrally formed field winding regions as exemplified at 552a as represented in FIGS. 27 and 29. Such regions extend a field winding length from adjacency with the flux interaction surfaces to a back iron region component shown at 554a in FIGS. 27 and 29. Those back iron region components are configured to be inserted within an arcuate back iron base component represented in general at 556 Component 556 is shown in FIG. 28 as incorporating arcuate slots 558a and 558b for receiving the back iron region components as described at 554a. Prior to the insertion into slots 558a and 558b, bobbin and field winding assemblies are positioned over the field winding regions as at 552a. In this regard, a polymeric bobbin 560a is shown associated with core component 544a and a polymeric bobbin 560b is shown associated with stator core component 544b. FIG. 27 reveals a field winding 562a supported by bobbin 560a. The motor function of fan 500 is of a two phase variety and it is necessary for star-up purposes that the mechanical detent or rest position be spaced from the energized zero torque position. This feature is developed by providing a cut off corner at the region of the flux interaction face as at 546a as shown in connection with FIG. 29 at 564a, as well as providing an extension of the flux interaction surface 546a as shown at 566a. When the fan is energized, air enters as represented at arrow 568 near the center of the fan in FIG. 27 and exits around the bottom edge, as represented at corresponding arrows 570 and 572.

Figure 30:
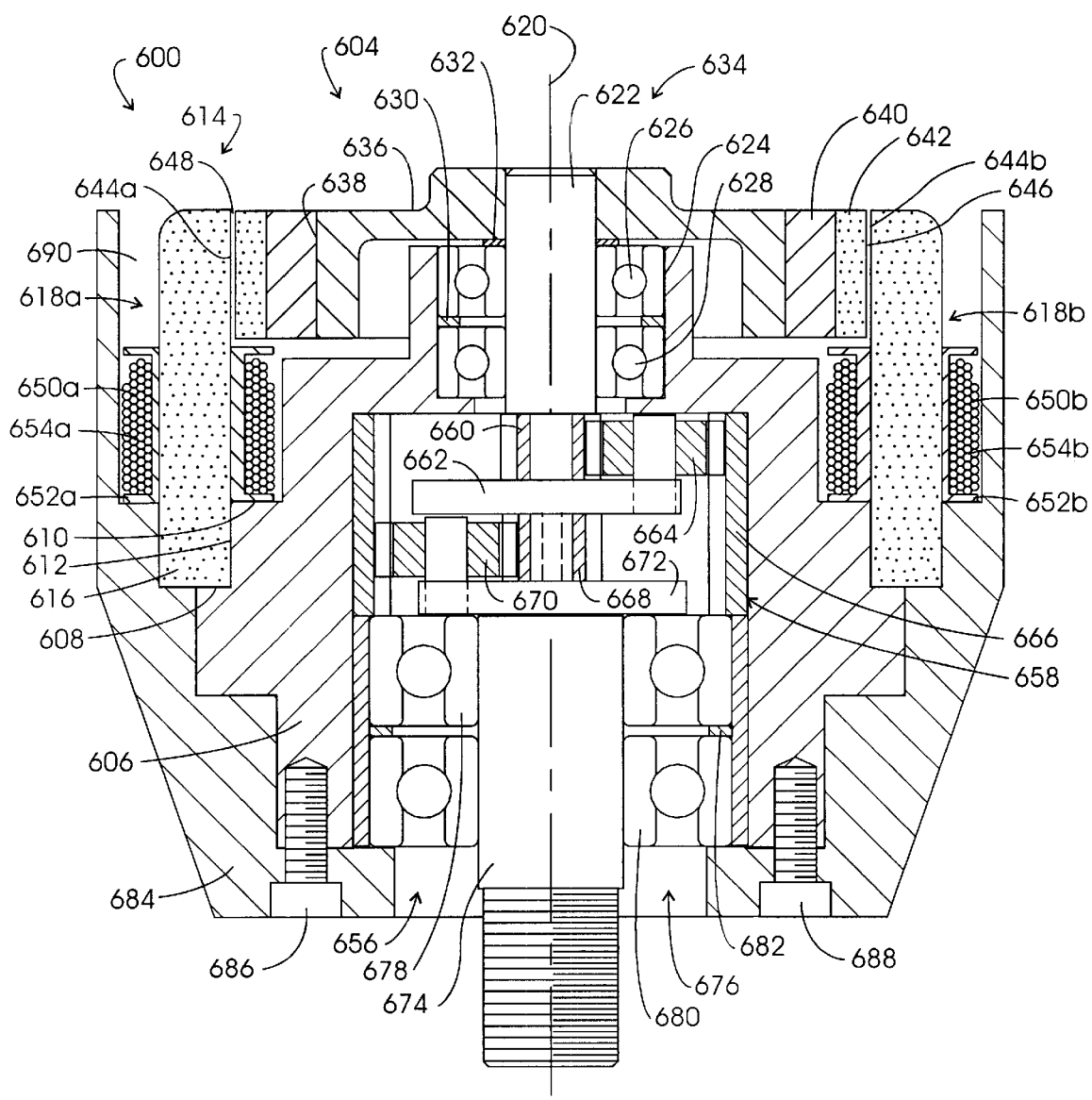
FIG. 30 is a sectional view of a motor with the architecture of the invention associated with drill related components including a reduction gear train.

As discussed above in connection with FIGS. 3, 7–9, 10–12, 13 and 15 the motor structures of the invention provide a relatively large volumetric region within their stator core assemblies which may be used for any of a variety of functional implementations. This typically permits the development of, for instance, tools which exhibit improved performance characteristics but with substantial reductions in size and weight. This can become quite important where industrial personnel are working overhead with their arms extended upwardly carrying the weight of the tool as it is used. FIG. 30 demonstrates this advantageous feature wherein a d.c. PM motor according to the invention is incorporated within a nut runner or drill form of tool shown generally at 600. Tool 600 incorporates a d.c. PM motor represented generally at 604 which is configured with a generally cylindrically-shaped base 606 which is machined to define annular ledges 608 and 610. Ledge 608 is configured along with cylindrically upstanding base portion 612 extending to ledge 610 for receiving and supporting a stator core assembly represented in general at 614. The ring-shaped base portion thereof is shown at 616. Assembly 614 is formed of pressure-shaped processed ferromagnetic particles which form in conjunction with the ring-shaped base isotropic upstanding core components two of which are seen in sectional fashion at 618a and 618b. The core components as at 618 are generally arranged in parallel relationship with the motor axis 620. Axis 620 is seen to extend through the center of a relatively short motor shaft 622. Shaft 622, in turn, is supported within a cylindrical bearing cavity 624 formed within base 606. In this regard, shaft 622 is supported by bearings 626 and 628. Bearing 628 is supported at the bottom of the cavity 624, while bearing 626 is supported between bearing spacer ring 630 and rotor spacer ring 632. Base 606 may be formed, for example of aluminum. Motor shaft 622 is seen to extend through rotor spacer or washer 632 for fixed engagement with a rotor represented generally at 634. Rotor 634 incorporates a nonmagnetic rotor support portion 636 which may be formed of a high strength plastic. Portion 636 is generally cylindrically-shaped and fixed to shaft 622 and its outer cylindrical surface 638 is fastened to a ring-shaped back iron component 640, the outward surface of which, in turn, supports a bonded rare earth magnet ring 642. As before, each of the core components of the stator core assembly 614, while arranged in generally parallel relationship to the motor axis 620, is formed with a flux interaction surface represented generally at 644a and 644b. Those surfaces are located and coextensive with the adjacent rotor confronting magnetic surfaces shown at 646 to define a working or functioning gap represented at 648. Integrally formed with and extending from the flux interaction surfaces as at 644a and 644b are the winding regions as at 650a–650b which, in turn, extend a field winding length from spaced adjacency with the flux interaction surfaces to the ring-shaped back iron region 616. As described earlier, the entire stator core assembly 614 is integrally formed using the noted pressure-shaped processed ferromagnetic particles. The figure shows two of a plurality of polymeric bobbins as at 652a and 652b which are configured with field windings as shown respectively at 654a–654b.

Base 606 is seen to be further configured with an internally disposed cylindrical functional implement cavity 656. Note that this cavity as well as the motor shaft 622 extends centrally within the available volume within the stator core assembly 614. Thus, compactness is achieved without loss of performance. Located within the cavity 656 is a gear head or planetary gear head assembly represented generally at 658. Assembly 658 includes one planetary gear set comprised of a sun gear 660 fixed to motor shaft 620, rotatable disc 662 and planetary gear 664. Planetary gear 664 is enmeshed with sun gear 660 as well as an outer cylindrical gear 666. Typically there are three planet gears as at 664 per planetary gear set. The secondary planetary gear set includes a sun gear 668 which is coupled to the disc 662 and is enmeshed with a planetary gear 670. Gear 670 is enmeshed in turn with the cylindrical gear 666 and is coupled in driving relationship with a disc 672. Disc 672, in turn, is coupled to a drive output shaft 674. Shaft 674 is supported within the cavity 656 by a bearing assembly 676 comprised of bearing 678 and 680. These bearings are spaced apart by a spacer ring 682. Base 606 further is coupled with an outer non-magnetic cowling 684 by machine screws as at 686 and 688. Note that the cowling 684 is configured having a cylindrical internal cavity 690 to permit clearance for the field winding assemblies.

Figure 31:
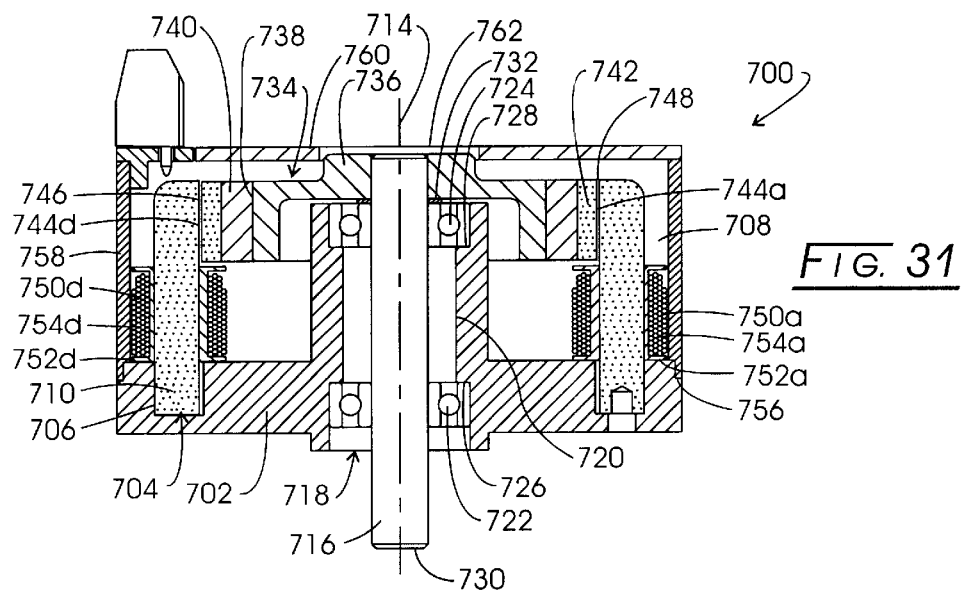
FIG. 31 is a sectional view of a generator structured according to the invention.
Figure 32:
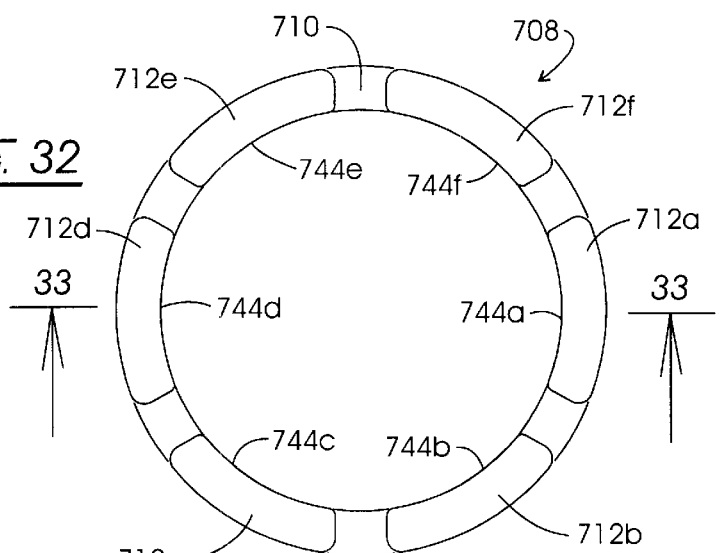
FIG. 32 is a top view of a stator core structure employed with the generator of FIG. 31.
Figure 33:
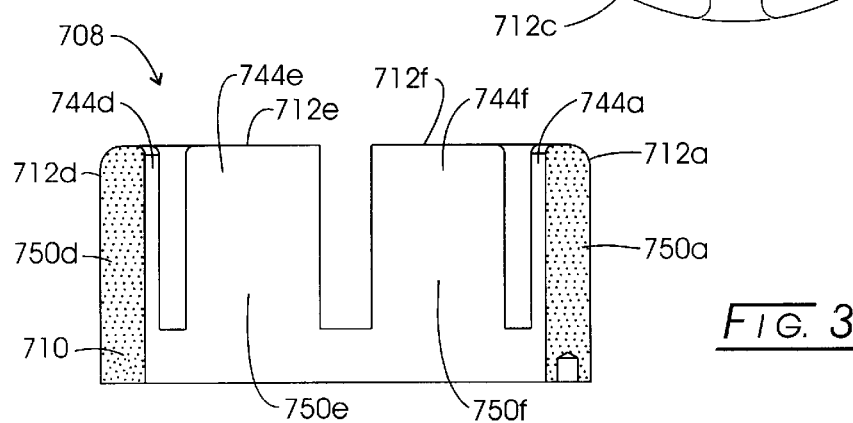
FIG. 33 is a sectional view taken through the plane 33—33 shown in FIG. 32.

The motor architecture described above also can be implemented as an electricity generator. The latter term "generator" is intended to have meaning in the generic sense as including conventional generators as well as alternators. Referring to FIG. 31 a generator structure designed in accordance with the teachings of the invention is represented generally at 700. Generator 700 is configured with a generally cylindrically-shaped generator base 702 formed of aluminum. Within the base 702 there is machined an annular groove represented generally at 704 exhibiting a rectangular cross section. Within this cross section, the outer annular surface 706 functions as a control for press fitting insertion thereinto of a stator core assembly represented generally at 708. Assembly 708 is formed of pressure-shaped process ferromagnetic particles which form, in conjunction with a ring-shaped base or back iron region 710, six isotropic upstanding core components shown in FIG. 32 at 712a–712f. Each of the core components 712a–712f of the stator core assembly 708 is generally arranged in parallel relationship with a generator axis 714. Returning to FIG. 31, axis 714 is seen extending through the center of the generator or rotor shaft 716. Shaft 716, in turn, is mounted within a bearing housing represented generally at 718. Housing 718 is formed within the aluminum base 702 as a cylindrical portion or cavity 720 having shoulder defining countersunk regions for supporting two ball bearing structures 722 and 724. In this regard, bearing 722 is located against an annular shoulder 726, while bearing 724 nest against a similar annular shoulder 728. Shaft 716 extends from a driven end 730 through a washer 732 for engagement with a rotor represented generally at 734. Rotor 734 incorporates a non-magnetic rotor support portion 736 which may be formed with a high strength plastic. Portion 736 is generally cylindrically-shaped and fixed to shaft 716 and its outer cylindrical surface 738 is fashioned to a ring-shaped back iron component 740, the outward surface of which, in turn, supports a bonded rare earth magnet ring 742. Looking additionally to FIGS. 32 and 33, each of the core components of the stator core assembly 708, while arranged in generally parallel relationship to the generator axis 714, is formed with a flux interaction surface represented generally at 744a–744f. As seen at flux interaction surfaces 744a and 744d in FIG. 31, those surfaces are located in spaced adjacency with and coextensive with the adjacent rotor confronting magnetic surfaces shown at 746 to define a working or functioning gap represented at 748. Integrally formed with and extending from the flux interaction surfaces 744a–744f are the winding regions 750a–750f which extend, in turn, a field winding length from spaced adjacency with the flux interaction surfaces 744a–744f to the ring-shaped back iron region 710. The entire stator core assembly 708 in integrally formed using the noted pressure-shaped processed ferromagnetic particles. Note that the external surface of the back iron region 710 is located in controlled surface adjacency with the outer annular surface 706 for fabrication control purposes. FIG. 31 shows two of the six polymeric bobbins as at 752a and 752d which are configured in conjunction with field windings as shown respectively at 754a and 754d. This structuring is repeated for each of the core components 712a–712f. Base 702 further is configured with an outer shoulder portion 756 which receives a corresponding flange of a cylindrical aluminum or polymeric generator side component 758. Component 758, in turn, extends to connection with a polymeric top and circuit support 760 having a circular opening 762 formed centrally there within.

Figure 34:
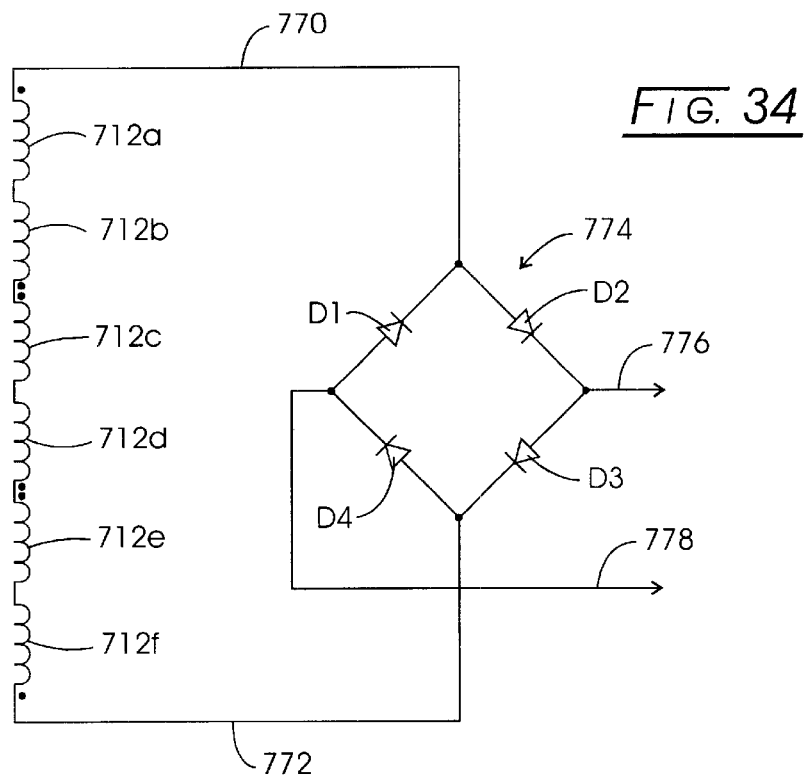
FIG. 34 is a schematic electrical diagram of field windings and a rectifier for a single phase adaptation of the generator of FIG. 31.
Figure 35:
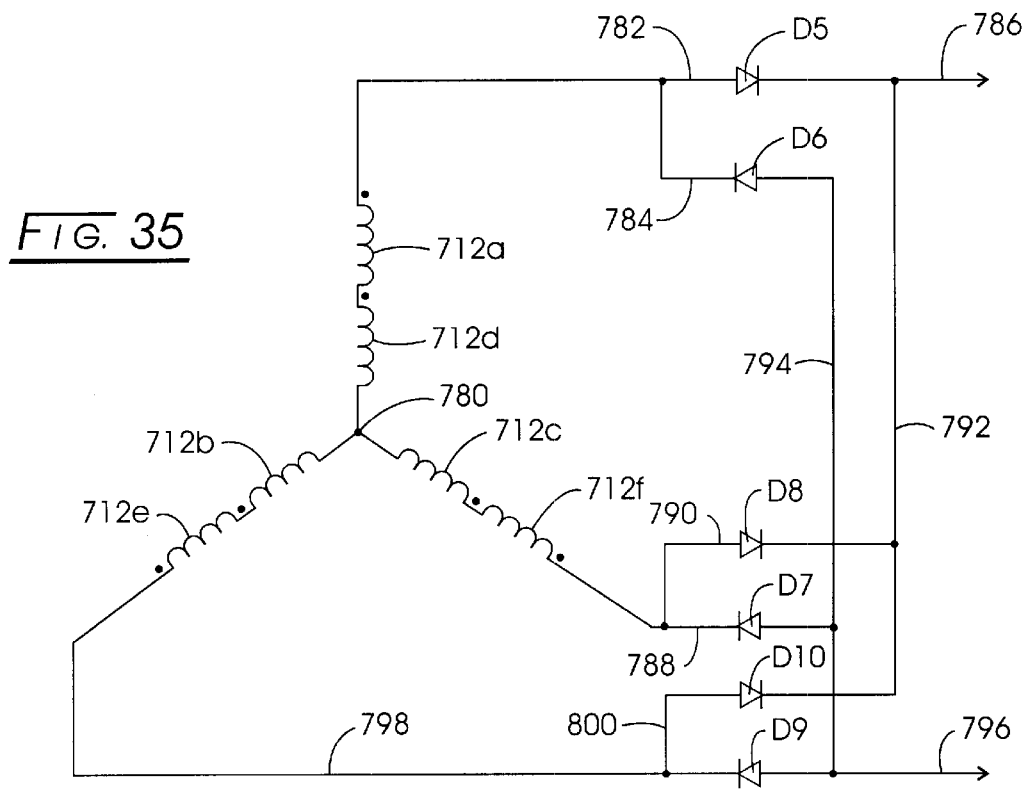
FIG. 35 is an electrical schematic diagram of the field windings and rectifier networks for a three-phase adaptation of the generator of FIG. 31.

For a single phase generator the number of magnetic poles or segments of the permanent magnet 742 will equal the number of poles or field windings. To provide a d.c. output for conventional generator applications, a rectifier is employed with the generator 700. Looking to FIG. 34, a single phase arrangement is schematically portrayed with field winding 712a–712f arranged in serial fashion. The dots shown in the figure represent a start winding convention. Serially coupled field windings 712a–712f are seen coupled via leads 770 and 772 to a bridge rectifier represented generally at 774 and configured with diodes D1–D4. With the arrangement shown, the output of the generator is provided at leads 776 and 778 as a d.c. potential. A three phase configuration for the generator 700 is represented in FIG. 35. In general, to provide for a three phase configuration, the rotor borne permanent magnets will, for the instant embodiment, be comprised of four or eight poles or magnetic segments. FIG. 35 illustrates a three phase circuit architecture wherein field windings 712a and 712d comprise one winding branch having a common connection 780 and extending to leads 782 and 784 incorporating complementary diodes D5 and D6. The cathode side of diode D5 provides one output at lead 786. Windings 712c and 712f are seen coupled between common connections 780 and leads 788 and 790 incorporating respective complementary diodes D7 and D8. The cathode side of diode D8 is seen extending through lead 792 to output lead 786, while the anode side of diode D7 is coupled via lead 794 in combination with the anode of diode D6 to output lead 796. Finally, field windings 712b and 712e are seen connected via leads 798 and 800 to respective complementary diodes D9 and D10. The anode side of diode D9 is coupled to output lead 796, while the cathode side of diode D10 is coupled via lead 792 to output lead 786.

Since certain changes may be made in the above described apparatus without departing from the scope of the invention herein involved, it is intended that all matter contained in the description thereof or shown in the accompanying drawings shall be interpreted as illustrative and not in a limiting sense.

What is claimed is:

1. A d.c. motor having a motor axis, comprising:
   a rotor having a sequence of generally arcuate regions of predetermined magnetization and a confronting magnetic surface of principal dimension in parallel with said motor axis, said rotor being rotatable about said motor axis;
   a stator core assembly having a select number of spaced isotropic core components formed of pressure shaped processed ferromagnetic particles which are generally mutually insulatively associated, each said core component being generally disposed in parallel relationship with said motor axis, having a flux interaction region with a flux interaction surface located adjacent said rotor confronting magnetic surface generally coextensive with said principal dimension thereof, defining a functioning air gap therewith having a gap radius, $R_G$, with respect to said motor axis, each said core component having a winding region extending generally in parallel relationship with said motor axis a field winding length from spaced adjacency with said flux interaction region to a back iron region, said back iron region interconnecting said core components in magnetic field exchange relationship, said core components and said back iron region having cross sectional areas selected for magnetic flux conveyance without saturation at the motor maximum design load; and
   a field winding assembly including winding components located around said core components and extending in electromagnetic flux coupling relationship about said winding region, said winding components being controllably electrically excitable for effecting driven rotation of said rotor about said motor axis.

2. The d.c. motor of claim 1 in which:
   said flux interaction region, said winding region and said back iron region are integrally formed together with said pressure shaped processed ferromagnetic particles.

3. The d.c. motor of claim 2 in which:
   said flux interaction region and said winding region extend in parallel relationship with said motor axis with a substantially common cross sectional area and shape.

4. The d.c. motor of claim 3 in which said back iron region is configured as a continuous ring symmetrically disposed about said motor axis.

5. The d.c. motor of claim 1 in which:
   each said flux interaction surface faces inwardly toward said motor axis; said rotor is configured with a ring-shaped permanent magnet component having an outwardly disposed confronting magnetic surface in parallel with said stator flux interaction surface and a back iron component coextensive with said permanent magnet component mounted for rotation about said motor axis.

6. The d.c. motor of claim 1 in which said d.c. motor further comprises:
   a thermally conductive base having a generally cylindrical surface coupled with said back iron region and a bearing housing symmetrically disposed about said motor axis;
   two, spaced apart bearings mounted within said bearing housing;
   a motor shaft mounted for rotation within said bearings about said motor axis having one end extending through said bearing housing and fixed in driven relationship with said rotor, and an oppositely disposed output end extending from said base;
   wherein each said winding component of said field winding assembly is configured with an electrically insulative bobbin having a central opening corresponding with said flux interaction region and said winding region so as to be slideable thereupon in intimate adjacency.

7. The d.c. motor of claim 6 in which:
   each said flux interaction surface faces inwardly toward said motor axis;

each said bobbin includes a lead guide assembly extending in parallel with said motor axis outwardly from and adjacent to a said core component to a tip portion located above said rotor;

including a circuit mounting member coupled with and supported from said lead guide assembly tips; and the beginning and ending leads of said winding components extend with said lead guide assembly for interconnection at said circuit mounting member.

8. The d.c. motor of claim 1 in which the ratio of said gap radius $R_G$, to the radius extending from said motor axis to the outer surface of said motor is greater than about 0.6.

9. The d.c. motor of claim 1 in which:

each said flux interaction surface faces radially outwardly from said motor axis;

said rotor is configured having an outer periphery extending over each said stator core component and including a ring shaped outwardly disposed rotor back iron component containing an inwardly adjacently disposed ring-shaped permanent magnet extending in spaced adjacency with each said flux interaction surface with said arcuate regions of magnetization said confronting magnetic surface defining said functioning air gap with each said flux interaction surface.

10. The d.c. motor of claim 9 in which that portion of said rotor extending over said stator core components is formed of non-magnetic and non-conductive material.

11. The d.c. motor of claim 9 in which said d.c. motor further comprises:

a base having a generally cylindrical shaped stator mount region supporting said stator core assembly at said back iron region and a first bearing mount symmetrically disposed about said motor axis;

a cover member having a top portion extending over and spaced from said rotor, a side portion extending from said top portion to connection with said base, and a second bearing mount symmetrically disposed about said motor axis;

a first bearing mounted within said first bearing mount;

a second bearing mounted within said second bearing mount; and a motor shaft mounted for rotation within said bearings about said motor axis and coupled in driven relationship with said rotor.

12. The d.c. motor of claim 9 in which said motor further comprises:

a base having a generally cylindrical shaped stator mount region supporting said stator core assembly at said back iron region and a bearing housing symmetrically disposed about said motor axis;

two spaced apart bearings mounted within said bearing housing;

a motor shaft mounted for rotation within said bearings about said motor axis, said motor shaft extending through said bearing housing and fixed in driven relationship with said rotor.

13. The d.c. motor of claim 9 in which:

said flux interaction region, said winding region and said back iron region are integrally formed together with said pressure shaped processed ferromagnetic particles.

14. The d.c. motor of claim 13 in which:

said flux interaction region and said winding region extend in parallel relationship with said motor axis with a substantially common cross sectional area and shape.

15. The d.c. motor of claim 14 in which said back iron region is configured as a continuous ring symmetrically disposed about said motor axis.

16. The d.c. motor of claim 1 in which:

said stator core assembly core components are configured having a said flux interaction region which exhibits an arc-shaped flair defining dimension extending generally normally to a radius extending from said motor axis;

said winding region extends integrally from said flux interaction region and exhibits a lateral cross sectional shape with a dimension extending generally normally to said radius less than said flair defining dimension;

said back iron region comprises an insertion key portion formed integrally with and extending from said winding region;

said back iron region further comprises a generally ring shaped base portion having a circular edge which is interrupted by a radially extending keyway at the location of each said core component, said keyway being dimensioned to slideably receive a said insertion key portion in abutting, nesting and supporting relationship.

17. The d.c. motor of claim 1 in which:

said stator core assembly core components are configured having a said flux interaction region which exhibits an arc-shaped flair defining dimension extending generally normally to a radius extending from said motor axis;

said winding region is configured having first and second components which are abuttably engageable to define a lateral cross sectional shape with a dimension extending generally normally to said radius less than said flair defining dimension;

said first winding region component extending from and being integrally formed with said flux interaction region; and said back iron region is configured having a general ring shape with a surface supporting said winding region second components at the location of each said core component.

18. The d.c. motor of claim 17 in which each said winding component of said field winding assembly is configured with an electrically insulative bobbin having a central opening corresponding with said winding region cross sectional shape effective to retain said winding region first and second components in abutting engagement.

19. The d.c. motor of claim 1 in which:

said stator core assembly core components are configured with a said flux interaction surface which is offset radially from said field winding region an extent effective to minimize axially directed magnetic attraction between said rotor arcuate regions of predetermined magnetization and said field winding region.

20. The d.c. motor of claim 19 in which:

said winding region is integrally formed with and extends from said flux interaction region;

said back iron region comprises an insertion key portion formed integrally with and extending from said winding region; and said back iron region further comprises a generally ring shaped base portion having a circular edge which is interrupted by a radially extending keyway at the location of each said core component, said keyway being shaped to slideably receive a said insertion key portion in abutting, nesting and supporting relationship.

21. The d.c. motor of claim 1 in which:

said stator core assembly core components are configured having a said flux interaction region which exhibits a first cross sectional shape;

said winding region is integrally formed with and extends from said flux interaction region and exhibits a second cross sectional shape different than said first cross sectional shape;

said back iron region comprises an insertion key portion formed integrally with and extending from said winding region; and said back iron region further comprises a generally ring shaped base portion having a circular edge which is interrupted by a radially extending keyway at the location of each said core component, said keyway being shaped to slideably receive a said insertion key portion in abutting, nesting and supporting relationship.

22. The d.c. motor of claim 1 in which:

said winding components of said field winding assembly are controllably electrically excitable in a predetermined number of excitation phases;

said rotor is configured having a rotor body mounted for rotation upon a shaft about said motor axis and having a peripherally disposed ring shaped permanent magnet component establishing said arcuate regions of magnetization and defining said functioning air gap with each said flux interaction surface; and including a functional utility component mounted to extend internally about said motor axis to a region surmounted by said stator core assembly.

23. The d.c. motor of claim 22 in which said functional utility component is an impeller rotatable with said rotor to move a fluid.

24. The d.c. motor of claim 22 in which said functional utility component is a gear head.

25. The d.c. motor of claim 22 in which said functional utility component is a planetary gear head.

26. The d.c. motor of claim 1 in which said stator core assembly flux interaction regions of said core components have a radial thickness greater than the corresponding thickness of an associated said winding region to space each said flux interaction surface radially away from an associated said field winding assembly winding component an amount effective to diminish axial bias at said rotor regions of predetermined magnetization.

27. The d.c. motor of claim 1 in which:

said winding components of said field winding assembly are controllably electrically excitable in a predetermined number of excitation phases;

said rotor is configured having a rotor body mounted for rotation upon a shaft about said motor axis and having a peripherally disposed ring shaped permanent magnet component establishing said arcuate regions of magnetization and defining said functioning air gap with each said flux interaction surface;

including a functional utility component mounted within said rotor body intermediate said shaft and said permanent magnet component; and said select number of spaced isotropic core components is or multiples of an interger of said predetermined number of excitation phases.

28. The d.c. motor of claim 27 in which said functional utility component is an impeller rotatable with said rotor to move a fluid.

29. The d.c. motor of claim 27 in which said predetermined number of excitation phases is two.

30. The d.c. motor of claim 27 in which said predetermined number of excitation phases is three.

31. An electricity generator drivably operable about a generator axis to generate an output approaching a maximum design current, comprising:

a rotor having a sequence of generally arcuate regions of predetermined magnetization and a confronting magnetic surface of principal dimension in paralleled with said generator axis, said rotor having a rotor shaft fixed thereto and drivable for rotation about said generator axis;

a stator core assembly having a select number of spaced isotropic core components formed of pressure shaped processed ferromagnetic particles which are generally mutually insulatively associated, each said core component being generally disposed in parallel relationship with said generator axis, having a flux interaction region with a flux interaction surface located adjacent said rotor confronting magnetic surface generally coextensive with said principal dimension thereof defining a functioning air gap therewith having a gap radius R, with respect to said generator axis, each said core component having a winding region extending generally in parallel relationship with said generator axis a field winding length from spaced adjacency with said flux interaction region to a back iron region, said back iron region interconnecting said core components in magnetic field exchange relationship, said core components and said back iron region having cross sectional areas selected for magnetic flux conveyance without saturation at said maximum design current;

a field winding assembly including winding components located around said core components and extending in electromagnetic flux coupling relationship about said winding region, said winding components being electrically coupled with a generator output for providing generated potential upon driven rotation of said rotor about said generator axis.

32. The generator of claim 31 in which:

said flux interaction region, said winding region and said back iron region are integrally formed together with said pressure shaped processed ferromagnetic particles.

33. The generator of claim 32 in which:

said flux interaction region and said winding region extend in parallel relationship with said motor axis with a substantially common cross sectional area and shape.

34. The generator of claim 33 in which said back iron region is configured as a continuous ring symmetrically disposed about said generator axis.

35. The generator of claim 31 in which said generator further comprises:

a thermally conductive base having a generally cylindrical shaped stator mount region supporting said stator at said back iron region and a bearing housing symmetrically disposed about said generator axis;

two, spaced apart bearings mounted within said bearing housing;

said rotor shaft being mounted for rotation within said bearings about said generator axis having one end extending through said bearing housing and fixed in drive relationship with said rotor, and an oppositely disposed driven end extending from said base;

wherein each said winding component of said field winding assembly is configured with an electrically insulative bobbin having a central opening corresponding with said flux interaction region and said winding region so as to be slideable thereupon in intimate adjacency.

36. The generator of claim 31 in which:

each said flux interaction surface faces inwardly toward said motor axis;

said rotor is configured with a ring shaped permanent magnet component having an outwardly disposed confronting magnetic surface in parallel with said stator flux interaction surface and a back iron component coextensive with said permanent magnet component mounted for rotation about said motor axis.

37. The generator of claim 31 in which:

each said flux interaction surface faces radially outwardly from said motor axis;

said rotor is configured having an outer periphery extending over each said stator core component and including a ring shaped outwardly disposed rotor back iron extending in spaced adjacency with each said flux interaction surface and an inwardly adjacently disposed ring shaped permanent magnet component with said arcuate regions of magnetization said confronting magnetic surface defining said functioning air gap with each said flux interaction surface.

38. The generator of claim 37 in which that portion of said rotor extending over said stator core components is formed of non-magnetic and non-conductive material.

39. The generator of claim 37 in which said generator further comprises:

a thermally conductive base having a generally cylindrical shaped stator mount region supporting said stator core assembly at said back iron region and a first bearing mount symmetrically disposed about said motor axis;

a cover member having a top portion extending over and spaced from said rotor, a side portion extending from said top portion to connection with said base, and a second bearing mount symmetrically disposed about said generator axis;

a first bearing mounted within said first bearing mount;

a second bearing mounted within said second bearing mount; and said rotor shaft being mounted for rotation within said bearings about said generator axis.

40. The generator of claim 37 in which:

said flux interaction region, said winding region and said back iron region are integrally formed together with said pressure shaped processed ferromagnetic particles.

41. The generator of claim 40 in which:

said flux interaction region and said winding region extend in parallel relationship with said generator axis with a substantially common cross sectional area and shape.

42. The generator of claim 41 in which said back iron region is configured as a continuous ring symmetrically disposed about said generator axis.

43. The generator of claim 31 in which:

said stator core assembly core components are configured having a said flux interaction region which exhibits an arc-shaped flair defining dimension extending generally normally to a radius extending from said generator axis;

said winding region extends integrally from said flux interaction region and exhibits a lateral cross sectional shape with a dimension extending generally normally to said radius less than said flair defining dimension;

said back iron region comprises an insertion key portion formed integrally with and extending from said winding region;

said back iron region further comprises a generally ring shaped base portion having a circular edge which is interrupted by a radially extending keyway at the location of each said core component, said keyway being dimensioned to slideably receive a said insertion key portion in abutting, nesting and supporting relationship.

44. The generator of claim 31 in which:

said stator core assembly core components are configured having a said flux interaction region which exhibits an arc-shaped flair defining dimension extending generally normally to a radius extending from said motor axis;

said winding region is configured having first and second components which are abuttably engageable to define a lateral cross sectional shape with a dimension extending generally normally to said radius less than said flair defining dimension;

said first winding region component extending from and being integrally formed with said flux interaction region; and said back iron region is configured having a general ring shape with a surface supporting said winding region second components at the location of each said core component.

45. The generator of claim 44 in which each said winding component of said field winding assembly is configured with an electrically insulative bobbin having a central opening corresponding with said winding region cross sectional shape effective to retain said winding region first and second components in abutting engagement.

46. The generator of claim 31 in which:

said stator core assembly core components are configured with a said flux interaction surface which is offset radially from said field winding region an extent effective to minimize axially directed magnetic attraction between said rotor arcuate regions of predetermined magnetization and said field winding region.

47. The generator of claim 46 in which:

said winding region is integrally formed with and extends from said flux interaction region;

said back iron region comprises an insertion key portion formed integrally with and extending from said winding region; and said back iron region further comprises a generally ring shaped base portion having a circular edge which is interrupted by a radially extending keyway at the location of each said core component, said keyway being shaped to slideably receive a said insertion key portion in abutting, nesting and supporting relationship.

48. The generator of claim 31 in which:

said stator core assembly core components are configured having a said flux interaction region which exhibits a first cross sectional shape;

said winding region is integrally formed with and extends from said flux interaction region and exhibits a second cross sectional shape different than said first cross sectional shape;

said back iron region comprises an insertion key portion formed integrally with and extending from said winding region; and said back iron region further comprises a generally ring shaped base portion having a circular edge which is interrupted by a radially extending keyway at the location of each said core component, said keyway being shaped to slideably receive a said insertion key portion in abutting, nesting and supporting relationship.

* * * * *